(12) United States Patent
Davison et al.

(10) Patent No.: US 12,440,608 B2
(45) Date of Patent: *Oct. 14, 2025

(54) POLYURETHANE COMPOSITE SHEET, A METHOD OF MAKING SUCH COMPOSITE SHEET, AND USE THEREOF IN MAKING A MEDICAL IMPLANT

(71) Applicant: DSM IP Assets B.V., Heerlen (NL)

(72) Inventors: Noel L. Davison, Echt (NL); Mandy Maria Jozefina Wiermans, Echt (NL); Nicolaes Hubertus Maria De Bont, Echt (NL); Mark Kenneth Hazzard, Echt (NL)

(73) Assignee: DSM IP ASSETS B.V., Maastricht (NL)

( * ) Notice: Subject to any disclaimer, the term of this patent is extended or adjusted under 35 U.S.C. 154(b) by 100 days.

This patent is subject to a terminal disclaimer.

(21) Appl. No.: 18/023,801

(22) PCT Filed: Aug. 30, 2021

(86) PCT No.: PCT/EP2021/073912
§ 371 (c)(1),
(2) Date: Feb. 28, 2023

(87) PCT Pub. No.: WO2022/049038
PCT Pub. Date: Mar. 10, 2022

(65) Prior Publication Data
US 2023/0310718 A1 Oct. 5, 2023

(30) Foreign Application Priority Data
Sep. 1, 2020 (EP) .................................. 20193942

(51) Int. Cl.
*A61L 31/06* (2006.01)
*A61L 31/14* (2006.01)
(Continued)

(52) U.S. Cl.
CPC ............... *A61L 31/06* (2013.01); *A61L 31/14* (2013.01); *C08L 75/04* (2013.01); *D06N 3/14* (2013.01);
(Continued)

(58) Field of Classification Search
None
See application file for complete search history.

(56) References Cited

U.S. PATENT DOCUMENTS 12,171,905 B2 * 12/2024 De Bont ................ C08G 18/48
12,171,906 B2 * 12/2024 De Bont ................ A61L 27/16
(Continued)

FOREIGN PATENT DOCUMENTS

| EP | 0331345 A2 | 9/1989 |
|---|---|---|
| WO | 2019197353 A1 | 10/2019 |

(Continued)

OTHER PUBLICATIONS

G. Cacciola, et al., A Synthetic fiber-enforced stentless heart valve, Journal of Biomechanics 33 (2000), pp. 653-658.
(Continued)

*Primary Examiner* — Arti Singh-Pandey
(74) *Attorney, Agent, or Firm* — Nixon & Vanderhye, P.C.

(57) ABSTRACT

Disclosed herein is a polyurethane composite sheet comprising o a biocompatible and biostable polyurethane elastomer comprising polysiloxane segments, the polyurethane forming a continuous matrix of the sheet; and o a woven or braided fabric having a thickness of 15-150 µm and comprising biocompatible, high-strength polymer fibers; wherein the composite sheet comprises 10-90 mass % of polyurethane, has a thickness of 25-250 µm and an areal density of 5-300 g/m$^2$; and wherein the composite sheet has, in at least one direction, non-linear uniaxial tensile behavior
(Continued)

characterized by a 1%-secant modulus of 20-200 MPa, a hardening transition point at 10-45%, and a tensile strength of at least 25 MPa (measured in water at 37° C.).

19 Claims, 3 Drawing Sheets

(51) Int. Cl.
  *C08L 75/04* (2006.01)
  *D06N 3/14* (2006.01)
(52) U.S. Cl.
  CPC ....... *A61L 2400/18* (2013.01); *C08L 2201/06* (2013.01); *C08L 2203/02* (2013.01); *C08L 2203/16* (2013.01); *D06N 2201/0254* (2013.01); *D06N 2203/068* (2013.01); *D06N 2211/18* (2013.01)

(56) References Cited

U.S. PATENT DOCUMENTS

| | | | |
|---|---|---|---|
| 2003/0078652 A1 | 4/2003 | Sutherland | |
| 2003/0114924 A1 | 6/2003 | Moe | |
| 2005/0177227 A1 | 8/2005 | Heim et al. | |
| 2006/0116713 A1* | 6/2006 | Sepetka | A61B 17/12145 |
| | | | 606/200 |
| 2010/0249922 A1 | 9/2010 | Li et al. | |
| 2012/0172978 A1 | 7/2012 | Dumontelle | |
| 2012/0290082 A1 | 11/2012 | Quint et al. | |
| 2013/0274874 A1 | 10/2013 | Hammer | |
| 2014/0005772 A1 | 1/2014 | Edelman et al. | |
| 2016/0296323 A1 | 10/2016 | Wulfman et al. | |
| 2016/0296325 A1 | 10/2016 | Edelman et al. | |
| 2017/0065411 A1 | 3/2017 | Grundeman et al. | |
| 2017/0071729 A1 | 3/2017 | Wrobel | |
| 2017/0354802 A1 | 12/2017 | Krautkremer et al. | |
| 2018/0016380 A1 | 1/2018 | Coury et al. | |
| 2019/0351099 A1 | 11/2019 | McCarthy et al. | |
| 2020/0188098 A1 | 6/2020 | Alkhatib et al. | |
| 2022/0023501 A1* | 1/2022 | De Bont | A61L 27/34 |
| 2025/0032674 A1* | 1/2025 | Hazzard | B32B 5/026 |

FOREIGN PATENT DOCUMENTS

| | | |
|---|---|---|
| WO | 2020178227 A1 | 9/2020 |
| WO | 2020178228 A1 | 9/2020 |
| WO | 0224119 A1 | 3/2022 |

OTHER PUBLICATIONS

International Search Report and Written Opinion Dated Dec. 10, 2021.

* cited by examiner

POLYURETHANE COMPOSITE SHEET, A METHOD OF MAKING SUCH COMPOSITE SHEET, AND USE THEREOF IN MAKING A MEDICAL IMPLANT

CROSS-REFERENCE TO RELATED APPLICATIONS

This application is a U.S. national phase entry under 35 USC § 371 of International Application No. PCT/EP2021/073912, filed 30 Aug. 2021, which claims priority to European Application No. 20193942.8, filed 1 Sep. 2020, the entire contents of each of which is hereby incorporated by reference in its entirety as if fully set forth herein.

FIELD

The disclosed invention pertains to a polyurethane composite sheet suitable for making a medical implant component like a leaflet for a prosthetic heart valve, a method of making such composite sheet, to use of said polyurethane composite sheet in making a medical implant, and to a medical implant, such as a heart valve prosthesis, comprising such composite sheet.

BACKGROUND

The term sheet is generally used for a thin piece of material such as a piece of paper or a fabric, and composite for a material made up of two or more distinct, structurally complementary components, usually a matrix material and a reinforcing material. A composite sheet is a composite material in sheet form comprising a polymer matrix and reinforcing fibers, which may be used in making an implantable medical device, especially for making leaflets of a prosthetic heart valve.

Heart valve diseases are among the leading causes of death. Heart valve diseases may result in disturbances in the controlled flow of blood in and out of the heart and its chambers during cardiac cyclic loading of about 30 million times a year. Although it is preferred to surgically repair a diseased valve, each year some 300,000 patients need to undergo valve replacement surgery worldwide. This number is projected to grow rapidly with the increasing average age of the population.

The clinical use of heart valve prostheses started already more than half a century ago. Initially, mechanical valves made from metal-carbon combinations were used and showed high durability. However, such valves are typically prone to infection, inflammation and thrombosis, requiring lifelong use of anti-coagulation medication by the patient. In addition, implantation of such valve requires open-heart-surgery, which may be unsuitable for many patients.

Subsequently, so-called bioprosthetic valves were introduced. Such valves typically apply a xenograft, like chemically crosslinked bovine or porcine pericardium, for the valve leaflets, which leaflets are mounted in a support structure. These bioprosthetic valves may experience calcification leading to thickening and stiffening, and eventually to insufficient opening and closing of the valve. The lifetime of such valves is limited to about 7-10 years. Yet, bioprosthetic valves have become the gold standard and provide a distinct advantage over mechanical valves because they can be made as collapsible/expandable prostheses that can be implanted using minimally invasive techniques, like Transcatheter Aortic Valve Replacement (TAVR) or Implantation (TAVI).

Typically, such bioprosthetic heart valves have a one-way valve structure, also called valve assembly or leaflet assembly, mounted in a support structure also referred to as stent or frame, which may be made from a metal like nitinol or a polymer. In case of collapsible/expandable prostheses, the stented valve can be self-expanding or balloon expandable. The valve assembly may consist of two or (mostly) three leaflets, and a skirt or cuff to which the leaflets are attached. The skirt, and therewith leaflets, is attached to and at least partly covers the inner and/or outer surface of the stent and may aid in preventing or reducing leakage around the outside of the valve (often called paravalvular leakage). The skirt may also be made from treated natural tissue, but is generally based on synthetic material, like a polyester fabric or a polytetrafluoroethylene film. Said components may be attached to the stent in various ways, like by suturing, gluing or heat bonding. Each leaflet has a free edge, also called free margin, which edges move toward each other to coapt and to close the valve, and which move toward the inner wall of the support structure to open the valve under changing blood pressure.

Research on alternative approaches to make prosthetic valves that could function longer than present 5 to 10 years of bioprosthetic valves, include applying synthetic materials and tissue engineering, and gained much attention during last decades. Tissue engineering aims to generate implantable tissues by encapsulating or seeding cells in biodegradable scaffolds, culturing the cell constructs under appropriate conditions in bioreactors, and implanting the pre-conditioned constructs to gradually acquire the characteristics of native tissue in vivo. Such technologies are not ready yet for clinical application.

Requirements for synthetic materials that can be used in implants in general relate to biocompatibility, biodegradability vs biostability, mechanical properties like strength, and purity (i.e. free from toxic substances and additives like lubricants and sizing agents). As minimally invasive approaches for prosthetic heart valves are becoming more and more adopted in view of clinical benefits like faster recovery time of patients, the need for a lower profile of devices used also increases. This requires that materials for leaflets and skirts have certain pliability, allowing compacting and compressing to fit within a narrow delivery system. Using lower thickness materials may appear a logical choice but can negatively affect long term properties and performance of the material in use. Another limitation in choosing a synthetic leaflet material may be the design paradigm that a prosthetic heart valve should closely mimic the natural valve design, and that the valve assembly should be a cusp with leaflets that are cup-shaped or have a belly to provide the necessary durability and blood flow dynamics (hemodynamics) that will not induce clotting. To create such valve design, typically applied methods comprise either making a shaped leaflet or leaflet assembly by coating or heat forming material on a mold or mandrel, or by cutting a shape from a sheet-like material and assembling three pieces into a 3-dimensional leaflet assembly, for example by suturing leaflets to each other and to a skirt and/or stent.

Numerous synthetic polymers have been proposed and/or evaluated as material for making valve leaflets, but so far such synthetic heart valves have not found clinical use. Bezuidenhout et al. addressed such research in a review article, with a focus on polyurethanes, a class of segmented copolymers having elastomeric properties that has been widely investigated for such biomedical use (see DOI: 10.1016/j.biomaterials.2014.09.013). Classical polyurethanes comprising polyester or polyether soft segments were found to be prone to hydrolytic and/or oxidative degradation, and calcification and thrombosis was observed in animal tests with valve prostheses. Valves based on alternative polyurethanes, comprising segments based on polycarbonates and/or polysiloxanes, showed promising results regarding durability and hemodynamics.

In order to increase mechanical properties and durability of synthetic valves, use of various composite materials has also been proposed. One of the advantages indicated is to make a material having certain anisotropy, like a natural valve leaflet that has a complex multilayer structure comprising elastic sheet-like material (elastin) and fibrous structures (collagen) oriented in different directions.

In US2003/0114924A1 a three-leaflet prosthetic heart valve is described, which is molded as one piece from a thermoplastic polyurethane. The valve has leaflets with certain curvature and thickness variation, and leaflets are separated from each other by a gap in unstressed state; requiring stretching of leaflet material to go to open and closed positions as in a natural valve.

A method of making a heart valve by reaction-injection molding of polyurethane compositions is described in US2018/0016380A1. Herein valve leaflets are made that comprise a partially crosslinked polyurethane based on an aromatic diisocyanate, a chain extender, a crosslinker and a soft segment like hydrogenated polybutadiene diol. Crosslinking the polyurethane would reduce degradation and strain relaxation in use.

EP0331345A2 relates to a heart valve prosthesis that has a frame and three leaflets, wherein the leaflets have been made from a triaxially woven fabric. Such fabric enables making leaflets that show more stretch in the radial than in circumferential direction of the valve. By using different fibers, for example high-strength fibers and elastomeric fibers, in strands of the woven such two way stretch behavior can be enhanced. It is further indicated that the woven may be embedded in an elastomeric matrix, for example in a polyurethane. Tri-axial weaving, however, is a complex technique requiring special equipment.

US2005/0177227A1 discloses a method of making a valve prosthesis from a textile material, like a polyester woven fabric, by shaping the textile on a shaping member to reproduce the geometry of a three-leaflet human valve, by e.g. cutting parts and heat forming the textile.

Cacciola et al. (Journal of Biomechanics, 33(6) (2000), p 653-658 and NL1008349) described a method of making a synthetic fiber-reinforced heart valve, wherein a shaped mandrel is first provided with a layer of EPDM rubber by solution coating, then reinforcing UHMWPE fibers are applied by winding thereon, and finally a second layer of rubber is applied.

WO2002/24119A1 relates to a valve prosthesis having leaflets formed from a polymer, the leaflets having a reinforcing member at the free edge for coaptation, resulting in the edge having a flexural rigidity that is up to three times greater than the unreinforced portions of the leaflet. The polymer for the leaflet may be chosen from a long list; polyurethanes, polysiloxanes and polytetrafluoroethylenes are mentioned as preferred materials. Suitable reinforcing members may be in the form of a strip or fibers and may be based on metals, polymer composites, carbon materials or other polymers that are stronger than the polymer of the leaflet. Leaflets may be made by different methods, typically by a dip coating process using a shaped mandrel.

US2003/0078652A1 discloses a stent-less heart valve prosthesis that includes leaflets of a laminated composite, wherein fibers are oriented along lines of stress in the material in use; to increase strength at critical points that would otherwise be foci for material failure. Such leaflets can be made by laying fibers in specific orientation over a curved mold, to which polymer sheets are laminated.

US2010/0249922A1 describes prosthetic heart valve leaflets made from a composite material comprising a knitted or woven fabric that is covered by or embedded in a flexible polymer. The composite would be easier stretchable along a first axis than along a second axis, to mimic anisotropic stretching of a natural leaflet. In addition, stretching along both axes can occur in two phases; a first phase wherein stretching is primarily due to deformation of a pattern of strands in the fabric and a second phase wherein stretching is primarily due to elongation of the strands. As suitable fibers for the fabric a number of polymers are mentioned, including polyester, nylon and polyethylene, and the flexible polymer may be for example a polyurethane, silicone, fluoroelastomer or a styrene/isobutylene block-copolymer. The publication does not provide actual sample compositions or properties.

In US2012/0172978A1 leaflets were made by cutting pieces from an isotropic filter made from polyester or polypropylene monofilaments with uniform pores, fusing or sealing the edges to prevent fraying, and assembling the pieces to form a valve, which valve can be collapsed and sterilized.

US2012/0290082A1 describes a transcatheter heart valve prosthesis comprising a support structure and a valve comprising leaflets made of an anisotropic composite material containing a woven fabric that is embedded in an elastomeric matrix and which material is locally reinforced by fibers, that is in regions of high stress during its intended use, in order to locally limit stretching. The composite may contain high-strength polyethylene fibers and a polyurethane as matrix material.

US2013/0274874A1 provides leaflets for a prosthetic valve, which leaflets comprise fibers that are arranged in V-shaped or curved patterns and in an angle relative to the free edge of a leaflet in a valve; resulting in less fibers and lower stiffness at the free edge. Such leaflets can be made by casting fibers into an elastomeric matrix, or by sandwiching and bonding fibers between two layers of elastic matrix. As suitable matrix materials sheets from polytetrafluoroethylene, polyurethane or polyester are mentioned; suitable fibers are based on carbon, aromatic polyester, aromatic polyamide or polyethylene.

US2014/0005772A1 describes making a prosthetic heart valve having three leaflets, wherein a leaflet assembly may be formed by first positioning fibers in one or two directions on a shaped mold, and subsequently applying at least one polyurethane by spray- or dip coating to at least partially embed the fibers in the polyurethane. The leaflets may have a substantially uniform thickness or a gradient in thickness, and may have isotropic or anisotropic mechanical properties.

US2016/0296323A1 discloses a prosthetic heart valve having leaflets made from a composite material comprising electrospun fibers at least partially embedded in a matrix of a polyisobutylene urethane copolymer. The fibers may be made from fluoropolymer, polyester, poly(styrene-isobutylene-styrene) tri-block copolymer (SIBS), or polyurethane, especially from a polyisobutylene urethane copolymer of higher hardness than the matrix. The electrospun fibers may be in the form of a woven to result in composite material with properties that are directionally dependent (anisotropic), or in the form of a non-woven providing an isotropic material. Also multilayered composites are described comprising 3 or more fiber layers, wherein fiber orientation in different layers may be different, for example to provide anisotropic physical and/or mechanical properties. Fibers may then be selected from an extensive list. Compositions, and therewith properties of the composite materials may vary widely but are not exemplified, and optionally various coatings could be applied.

US2016/0296325A1 also relates to prosthetic valves having synthetic leaflets with anisotropic properties, resulting from use of a composite material having a plurality of undulating fibers embedded in a polymer matrix. The fibers may extend in the composite in one or more directions, like extending along the free edge contour of a leaflet made therefrom. The undulated fibers provide the composite multi-stage tensile properties. Upon straining the composite, the undulated fiber will first stretch and once fibers have become straightened, a higher tension will be needed to further elongate the material. Initially, the elongation behavior of the composite material may be similar to the matrix material, whereas once most fibers are straightened the fibers mainly determine extensibility. The document indicates a multitude of synthetic and natural polymer materials from which fibers and matrix may be made, and various ways of making such composites, but without providing details or any specific embodiment.

In US2017/0071729A1 a prosthetic heart valve is described, which valve has leaflets comprising a composite material that has been made by at least partially embedding a plurality of pre-tensioned fibers in a polymer matrix. When tension is removed from the composite, fibers may relax to result in a composite with tensile behavior that may be comparable to the composite with pre-formed undulated fibers as described herein above. The fibers may be made from a metal like nitinol or from a polymer like PEEK, PES or UHMWPE; and the polymer matrix can be a polyurethane based on polyisobutylene soft segments.

In US2017/0065411A1 it is described to use a flexible fabric woven from UHMWPE fibers for making leaflets of a prosthetic heart valve. In view of the low extensibility of such material, an alternate design of leaflets with excess length of the free edges is described.

In US2019/0351099A1 a low-profile composite sheet of 15-250 μm thickness is described, which comprises a textile base layer and fluid impermeable polymer coating heat-laminated therewith and which sheet can be used as skirt or covering material for a heart valve prosthesis. The textile base layer may be a tubular structure comprising high tenacity monofilaments or yarns that are made from a resorbable or non-resorbable polymer, and the base layer can be made by knitting, weaving, braiding, or non-woven textile techniques. The polymer coating can be chosen from a long list of polymers, and may also function to adhere the composite sheet to a substrate; this way reducing or omitting use of sutures.

US2020/0188098A1 relates to polymer-containing fabric materials that may be used in making medical devices like venous valves, occluders, vascular conduits, grafts, skin patches, adhesion barriers and prosthetic heart valves. Fabrics may be made from several polymers including polytetrafluoroethylenes, polypropylenes, polyethylenes, polyurethanes, polyesters, and polyamides. The fabric may be uncoated, or a polymer film may have been applied to at least a portion of its surface; as one or more layers and/or as patterns of discrete layers on the fabric. The polymer layer may be applied to alter one or more properties of the fabric, like surface roughness, porosity, lubricity, prevent fraying, etc.; but it is indicated that fibers of the fabric mainly determine its properties. In an embodiment, a prosthetic heart valve is described which comprises leaflets that are formed from a high-density woven fabric of 50-100 μm thickness and having warp and weft strands of UHMWPE fibers, wherein fibers typically extend in a direction that is at an angle of 30-60 degrees to a line perpendicular to the free edge of a leaflet in flattened condition (or to a line parallel to the longitudinal axis of the heart valve). Said fabric of the leaflets is at least partially and on at least one side laminated with an UHMWPE film.

US2017/035480A1 relates to a catheter assembly comprising an expandable medical balloon. Positioned on the balloon is a braid that is made from first and second fibers, wherein the second fibers have a higher melting point than the first fibers that may be UHMWPE. A coating, which can be a thermoplastic polyurethane, may have been applied on the outer surface of the braid.

In WO2019/197353A1 a porous hybrid elastomer/polyethylene film is described, wherein at one or more spots, pores of a UHMWPE film have been partly filled with an elastomer like a polyurethane. The hybrid film shows improved resistance to initiation or occurrence of tearing or other failure at the modified spots of the film.

Despite the approaches as proposed in the above addressed documents, a clinically successful, heart valve prosthesis based on polymeric leaflets appears not yet reality; which may be largely due to the success of bioprosthetic valves, and to limited in vivo durability and thrombotic complications encountered with some prototype valves having polymeric leaflets. There thus still is a need for a synthetic, polymeric material that ideally combines biostability, bio- and hemocompatibility with properties like high pliability and formability, high toughness, sufficient elongation, high strength, and good fatigue resistance; which would enable making a valve prosthesis that combines hemodynamics of a bioprosthetic valve with enhanced durability. Preferably such polymeric material, and prosthetic valves, can be economically and consistently produced.

SUMMARY

Objects of the present disclosure include providing a synthetic material having a combination of properties that mitigates or prevents one or more of the above indicated disadvantages of the prior art materials, and which material is suitable for use in making a durable heart valve prosthesis, and optionally in other biomedical applications.

The aspects and embodiments as described herein below and as characterized in the claims provide a composite sheet of a polyurethane elastomer reinforced with a textile made from biocompatible high-strength polymer fibers, which composite sheet combines at least a number of said desired properties, and which composite sheet can be advantageously applied for making components of cardiovascular implants, like skirt and/or leaflets for a prosthetic heart valve.

More specifically and in accordance with an aspect of the invention, this disclosure provides a polyurethane composite sheet comprising:
  a biocompatible and biostable polyurethane elastomer comprising polysiloxane segments, the polyurethane forming a continuous matrix of the sheet; and
  a woven or braided fabric having a thickness of 15-150 μm and comprising biocompatible, high-strength polymer fibers; wherein the composite sheet comprises 10-90 mass % of polyurethane, has a thickness of 25-250 µm and an areal density of 5-300 g/m²; and wherein the composite sheet has, in at least one direction, non-linear uniaxial tensile behavior characterized by a 1%-secant modulus of 20-200 MPa, a hardening transition point at 10-40%, and a tensile strength of at least 25 MPa (measured in water at 37° C.).

It was found that such composite sheet is biocompatible and biostable, shows excellent hemocompatibility (which is demonstrated in applications WO2020/178227A1 and WO2020/178228A1), and further has high strength yet good pliability and formability. The composite sheets may be laser-cut to a desired size or shape, to result in cut edges that show good fraying resistance and suture retention. The composite sheet may have anisotropic properties and shows specific non-linear stress-strain behavior in at least one direction, i.e. at least along an axis oriented at 45° with warp and weft direction when based on a woven fabric with warp and weft yarns in 0°/90° orientation. Such tensile properties mimic the typical performance of natural heart leaflets and of treated pericardium, with initial elongation at relatively low stress, followed by strain hardening after a hardening transition point at 10-40% strain, which properties enable quick elastic response to pressure changes in the blood and prevent plastic deformation and over stretching of leaflets.

As the ultimate tensile strength of the present composite sheet is significantly higher than stress levels on a leaflet in an implanted prosthetic valve leaflet, it can be anticipated based on theory that the composite sheet will also have improved fatigue resistance over treated bovine pericardium material. This would enable making a valve prosthesis with enhanced durability.

Another advantage is that present composite sheets can be based on known and/or commercially available materials and may be produced with high consistency using existing manufacturing methods.

A further advantage of the polyurethane composite sheet may be that the polyurethane can also function as an adhesive upon a further use of the composite sheet. For example, the composite sheet may be formed into a multi-layer flat or tubular structure by solvent- or heat-activated binding one or more sheets together. Similarly, one or more composite sheets and/or pieces cut therefrom may be laminated by solvent- or heat-binding to another fibrous construct like a cable, tape, textile or fabric to for example locally optimize properties; or to another article, for example be attached to a stent frame to form a (partly) covered stent, thus reducing the need for attachment means like clamps or sutures. Thermal bonding of textiles composed of highly-crystalline synthetic fibers such as PET or UHMWPE, without a polyurethane as in the present composites, for example by using laser welding, generally deteriorates the textile morphology and/or its pliability.

In embodiments, the polyurethane composite sheet comprises
A biocompatible and biostable polyurethane elastomer comprising polysiloxane segments; and
A woven fabric substantially consisting of biocompatible, high-strength polyethylene fibers.

In accordance with another aspect, the present disclosure provides a method of making the polyurethane composite sheet, which method comprises steps of:
a) Providing a braided or woven fabric comprising biocompatible, high-strength polymer fibers;
b) Optionally activating the surface of the fabric by pre-treating with a high-energy source;
c) Embedding the textile with a biocompatible and biostable polyurethane elastomer comprising polysiloxane segments;
to result in a composite sheet that comprises 10-90 mass % polyurethane, has a thickness of 25-250 µm and an areal density of 5-300 g/m²; and wherein
the composite sheet has, in at least one direction, non-linear uniaxial tensile behavior characterized by a 1%-secant modulus of 20-200 MPa, a hardening transition point at 10-45%, and a tensile strength of at least 25 MPa (measured in water at 37° C.).

Further aspects of the disclosure concern the use of such polyurethane composite sheet in making a component for an implantable medical device and the use of such medical implant component in making an implantable medical device; especially said uses concern making one or more leaflets and making a prosthetic heart valve comprising such leaflets.

The present disclosure further provides an implantable medical device comprising a polyurethane composite sheet as defined herein.

In other aspects, uses of the polyurethane composite sheet of the present disclosure include applications wherein the composite sheet will be in contact with body tissue or fluids, such as in orthopedic applications including tissue reinforcement procedures or cardiovascular implants. Examples of materials for soft tissue reinforcement include meshes for hernia repair, abdominal wall reconstruction or degenerative tissue reinforcement. Cardiovascular implants include devices like a vascular graft, a stent cover, a mesh or a venous valve. In many of such applications suturing is used to connect the implant component to other parts of a device or to surrounding soft or bone tissue.

Other aspects include such medical devices or implants as indicated above, which comprise said polyurethane composite sheet or medical implant component.

A skilled person will understand that although the experiments are mainly relating to fabrics based on UHMWPE or PET fibers and certain thermoplastic polyurethanes, parts of the disclosures may similarly apply to flexible textiles made from other fibers and other polyurethanes; as further indicated in the detailed description.

DETAILED DESCRIPTION

Figure 1:
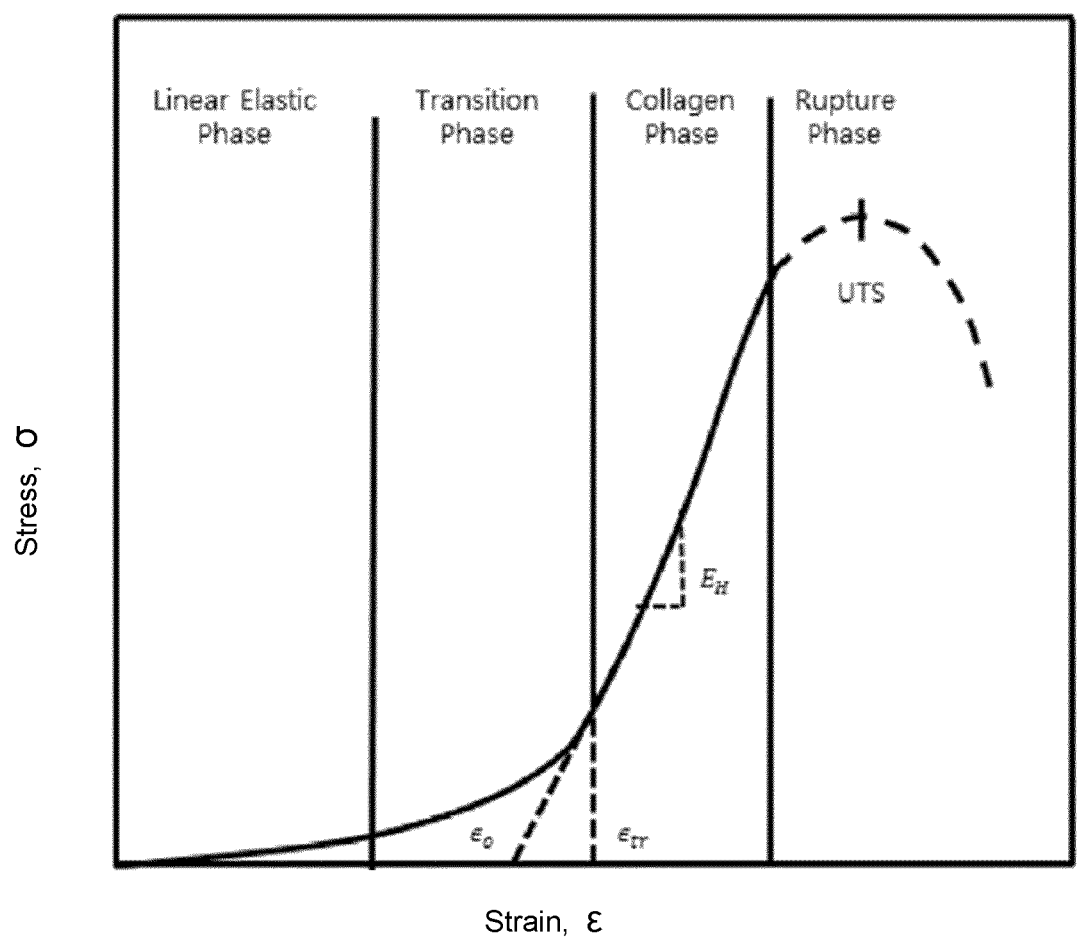
FIG. 1 shows a typical tensile stress-strain curve for soft biological tissue such as leaflets of human aortic and pulmonary heart valves.

Within the context of the present disclosure the following definitions are used. A fibrous construct is understood to comprise a structure made by interconnecting one or more strands of fibers, for example by interlacing, by using an adhesive or binder, or by partial melting; like a rope, cable, tape or textile. Ropes, cables and tapes are elongated constructs based on strands or fibers. A textile is a flexible material comprising a network of fibers, and typically has a thickness much smaller than its width and length, like a flat sheet having two sides or surfaces, or a hollow tubular form with inner and outer surfaces. Textiles include non-wovens, like a felt of randomly oriented fibers or a unidirectional sheet, and fabrics, like structures made by interlacing strands of fibers by techniques like knitting, crocheting, weaving, or braiding. A textile may be isotropic, that is have similar physical or mechanical properties in different directions; be anisotropic as a result of differences in type, number, and/or orientation of fibers in different directions; and may have a substantially constant thickness or show variations therein. A strand refers to a bundle or assembly of fibers, often used to indicate threads or elements forming a construct. Fiber(s) is a general term referring to one or more slender (thin and long) threadlike structures; and encompasses continuous fibers (also called filaments) and/or short fibers (also called staple fibers) and may refer to a single fiber or filament and/or to a yarn. A filament is understood to be a (single) thin thread with a generally round or oblong cross-section with diameter generally below 50 µm and typically made by a (melt or solution) spinning process. A yarn is a continuous bundle of filaments and/or staple fibers, optionally twisted together to enhance yarn coherency. A multi-filament yarn is a bundle of filaments, like at least 5 filaments optionally twisted together to enhance yarn bundle coherency. A spun yarn is a thread made by twisting together staple fibers. High-strength fibers are fibers having a tenacity, sometimes incorrectly equated with (ultimate) tensile strength, of at least 0.6 N/tex.

A composite sheet, like a composite textile, refers to a construct that combines two or more structural elements; such as a polymer composition as matrix and a textile as reinforcing fibers. A laminated textile is a textile having a layer of a polymer attached to one or two sides, which layer may have been applied by heat- or adhesive-bonding a polymer film or sheet, and a coated textile has a coating layer (e.g. of a polymer) on one or two sides or on a part thereof, which coating may have been applied as a solution, dispersion or melt, and which may have partially penetrated between and/or partially or fully covered fibers of the textile.

A knitted or crocheted textile is made from at least one strand that is interconnected by looping around itself; commercial knitted textiles are generally made on knitting machines applying multiple strands. A woven textile is made from at least 2 strands, with a—warp—strand running along the length of the construct and another—weft or fill—strand substantially perpendicular thereto; with warp and weft strands interlacing (crossing over and under each other) in a certain weave pattern. Knitted and woven fabrics may be flat sheet-like or (hollow) tubular structures. A braided fibrous construct or textile is made from at least 3 strands interlacing one another in a diagonally overlapping pattern; and is typically a flat, round or a tubular construct of relatively narrow width. Non-woven textiles can be made from staple or continuous fibers bound together by chemical, mechanical, solvent and/or heat treatment(s); like a felt, or a spun-bound or needle-punched fiber web. The fibers may be randomly oriented such as in a felt but may also be substantially oriented in one (or more) directions. In the last case, and especially if bound together by laminating, coating or impregnating with a polymer, such construct may also be referred to as a unidirectional (UD) composite.

A biocompatible material is biologically compatible by not producing a toxic, injurious, or immunologic response when in contact with living tissue. Biodegradable means a material is susceptible to chemical degradation or decomposition into simpler components by biological means, such as by an enzymatic action. Biostable or bioinert means the material is substantially non-biodegradable under conditions and time of intended use.

In accordance with an aspect, the invention provides a polyurethane composite sheet suitable for making a component of a medical implant, the sheet comprising A biocompatible and biostable polyurethane elastomer comprising polysiloxane blocks, the polyurethane forming a continuous matrix; and A textile being a woven or braided fabric having a thickness of 15-150 µm and comprising biocompatible, high-strength polymer fibers; wherein the composite sheet comprises 10-90 mass % of polyurethane, has a thickness of 25-250 µm and an areal density of 5-300 $g/m^2$; and wherein the composite sheet has, in at least one direction, non-linear uniaxial tensile behavior characterized by a 1%-secant modulus of 20-200 MPa, a hardening transition point at 10-45%, and a tensile strength of at least 25 MPa (measured in water at 37° C.).

The polyurethane composite sheet can form part of or form a medical implant component, meaning that the composite sheet can form a structural or strength providing part of such component, or the composite sheet is a medical implant component. Examples of other items that may form part of the implant component or form part of the medical implant include a metallic or polymeric stent frame, a skirt or cuff that may partly cover the stent, a suture that may connect the composite sheet to another item or component, or other fixation structures in case of a prosthetic heart valve. Such implant components may be covered with a temporary protective compound or film for packaging, or may be compressed and crimped in a capsule, all of which parts can be removed before using the implant component.

In embodiments of the present invention, the polyurethane composite sheet is a medical implant component, for example a piece of sheet formed into a certain shape, and does not comprise further components, which simplifies making an implant or device.

The polyurethane composite sheet of the present invention comprises a biocompatible and biostable polyurethane, which forms a continuous matrix with an embedded textile therein, meaning that the polyurethane substantially covers or encapsulates the polymer fibers of the textile. Such composite sheet may also be referred to as a fiber-reinforced or a textile-reinforced polyurethane sheet. When used as a component of an implanted medical device, the polyurethane, and not the embedded textile or fibers, will contact bodily tissue or fluid. The polyurethane used is biocompatible and biostable, meaning that it is not or only very slowly degraded under physiological conditions, allowing the implanted medical device to function for a longer period.

Polyurethane elastomers are typically block copolymers (also called segmented copolymers), and may be thermoplastics or thermosets (crosslinkable or crosslinked oligomers or polymers). An elastomer is a polymeric material showing relatively low tensile (and flexural) modulus and better elastic recovery after elongation or deformation, when compared with other synthetic polymers, for example from which the high-strength fibers are made. A thermoplastic elastomer can be repeatedly molten by heating and re-solidified by cooling; and derives its elasticity from reversible physical crosslinking instead of from chemical crosslinks as in thermoset elastomers. The polyurethane elastomer component of the composite sheet may be thermoplastic or form a thermoset during or after forming the composite sheet.

Block copolymers are polymers comprising blocks (also called segments) of polymers (including oligomers) that are chemically distinct, and which show different thermal and mechanical properties, and different solubilities. Generally, the blocks in a block copolymer comprising two (or more) types of blocks are referred to as being 'hard' and 'soft' polymer blocks, such different blocks resulting in microphase separation of hard and soft blocks. The hard block in a block copolymer typically comprises a rigid or high modulus polymer, with a melting temperature ($T_m$) or a glass transition temperature ($T_g$) higher than the use temperature, of e.g. about 35° C. The soft block in the block copolymer often comprises a flexible, low modulus, amorphous polymer with a $T_g$ lower than 25° C., preferably lower than 0° C. As for most mechanical properties, thermal parameters like $T_m$ and $T_g$ are generally determined on dry samples; using well-known techniques like DSC or DMA. In phase-separated block copolymers, the hard segments function as physical crosslinks for the flexible soft segments, resulting in materials having properties ranging from fairly stiff to flexible and elastic, depending on the ratio of hard to soft blocks. Depending on type and amount of hard blocks, the polyurethane may show good stability and elasticity over a desired temperature range without the need for chemical crosslinking; and can generally be processed as a thermoplastic.

In embodiments of the present disclosure, the polyurethane is a thermoplastic. This has advantages as it allows making a composite by heat-bonding or laminating polyurethane granules or sheets with a textile, but also by coating and impregnating a textile with a solution of the polyurethane. In addition, a composite sheet may be formed into a desired shape using a mold or mandrel and certain heating and cooling steps.

In other embodiments, the polyurethane is a thermosetting composition, which may be processed to form a composite with a textile during and/or after which the polyurethane is crosslinked, to stabilize the product and enhance for example mechanical properties like elasticity and fatigue resistance.

The term thermoplastic polyurethane elastomer (TPU) basically denotes a family of polymers with a typically substantially linear backbone comprising the reaction product of at least three principal components: a diisocyanate, a diol chain extender, and a polymer diol (also called macroglycol). Optionally, a monofunctional compound may be used as a further component functioning as a chain stopper and forming endgroups. Endgroups may function to only stop reaction, but can also be functional groups; like non-polar or hydrophobic endgroups or hydrophilic endgroups. Such functional end-group modified polyurethanes may show enhanced interactions with other materials, like with fibers in a composite or with biological material as an implant component.

In embodiments, the backbone of the polyurethane elastomer or the TPU applied in the present invention is linear and has one or an average of two hydrophobic endgroups.

In embodiments, the polyurethane elastomer comprises hard blocks that include urethane groups and optionally urea groups in repeating units, which have resulted from reaction of a diisocyanate with a diol and optionally a diamine as chain extender.

Suitable diisocyanates include aromatic, aliphatic and cycloaliphatic compounds, having an average of 1.9-2.1 isocyanate groups per molecule. In an embodiment, the diisocyanate comprises 4,4'-diphenylmethane diisocyanate (MDI), 2,4-toluene diisocyanate, 2,6-toluene diisocyanate (TDI), 1,4-phenylene diisocyanate, hexamethylene diisocyanate (HDI), tetramethylene-1,4-diisocyanate, cyclohexane-1,4-diisocyanate, dicyclohexylmethane-4,4'-diisocyanate (HMDI), isophorone diisocyanate (IPDI), or a mixture thereof. In an embodiment, the diisocyanate comprises hexamethylene diisocyanate, dicyclohexylmethane 4,4'-diisocyanate, isophorone diisocyanate, or a mixture thereof. In an embodiment, the diisocyanate consists of hexamethylene diisocyanate, dicyclohexylmethane 4,4'-diisocyanate, isophorone diisocyanate, or a mixture thereof.

In embodiments, the diisocyanate comprises 4,4'-diphenylmethane diisocyanate, 2,4-toluene diisocyanate, 2,6-toluene diisocyanate, or 1,4-phenylene diisocyanate. In other embodiments, the diisocyanate consists of 4,4'-diphenylmethane diisocyanate, 2,4-toluene diisocyanate, 2,6-toluene diisocyanate, 1,4-phenylene diisocyanate, or a mixture of two or more thereof. In an embodiment, the molar mass of the diisocyanate is from 100 to 500 g/mol. In an embodiment, the molar mass of the diisocyanate is from 150 to 260 g/mol.

Chain extenders are typically low molar mass aliphatic compounds, having two or more hydroxyl or amine groups. Bifunctional chain extenders result in linear, generally thermoplastic polymers, whereas multifunctional isocyanates and/or chain extenders would lead to branched or crosslinked products. In embodiments, the bifunctional chain extender has a molar mass of at least 60 g/mol, at least 70 g/mol, at least 80 g/mol, at least 90 g/mol, or at least 100 g/mol. In other embodiments, the chain extender has a molar mass of at most 500 g/mol, at most from 400 g/mol, at most 300 g/mol, at most 200 g/mol, or at most 150 g/mol. In embodiments, the chain extender comprises at least one of ethylene glycol, diethylene glycol, propylene glycol, dipropylene glycol, 1,3-propanediol, 1,4-butanediol, 1,5-pentanediol, 1,6-hexanediol, and 1,8-octanediol; and/or such corresponding diamines. Presence of urea groups resulting from reaction of isocyanate with amine groups, typically results in stronger molecular interactions; which may be an advantage depending on the application. In embodiments, the polyurethane elastomer comprises only diol chain extenders and shows thermoplastic behavior; that is the polyurethane elastomer is a thermoplastic polyurethane elastomer or TPU.

In other embodiments, the polyurethane elastomer comprises hard blocks having both urethane and urea linkages; such polymers sometimes also referred to as polyurethane urea elastomers. The advantage thereof is enhanced interaction between the hard blocks, allowing a higher content of soft blocks resulting in block copolymers, which show enhanced flexibility and elasticity, and excellent flex life or fatigue resistance. Depending on the ratio diol/diamine, the polyurethane elastomer may show such strong interaction that at a melt processing temperature thermal degradation may be such that solution processing is to be preferred for optimal performance. Commercially available examples of such polyurethane elastomers comprising both urethane and urea linkages include Biospan® products (available from e.g. DSM Biomedical BV, Sittard-Geleen NL).

In further embodiments, the polyurethane elastomer comprises soft blocks derived from a polysiloxane (also called silicone) diol or polyol and at least one aliphatic polymer diol or polyol chosen from the group consisting of polyethers, polyesters, polyacrylates, and polyolefins; which polymers are bifunctional with hydroxyl (or amine) terminal groups. The polymer diols for the soft blocks are understood herein to include oligomers, homopolymers and copolymers, and polyesters are considered to include polycarbonates. Generally known polyurethane block copolymers and methods to prepare these copolymers are described in for example U.S. Pat. Nos. 4,739,013, 4,810,749, 5,133,742 and 5,229,431.

In embodiments of the present disclosure the polyurethane elastomer comprises soft blocks derived from a polysiloxane diol and at least one polymer diol chosen from an aliphatic polyester diol, an aliphatic polyether diol, and a poly(isobutylene) diol. As for chain extenders, also amine-functional soft blocks can be used, resulting in additional urea linkages. Biocompatibility and biostability of such polyurethane block copolymers in the human body has been proven.

Mechanical and other properties of a polyurethane elastomer can be tailored by varying chemical compositions and/or molar mass of the blocks. The hard blocks of a polyurethane elastomer for use in the composite sheet may have a molar mass of about 160 to 10,000 Da, and more preferably of about 200 to 2,000 Da. The molar mass of the soft segments may be typically about 200 to 100,000 Da, and preferably at least about 400, 600, 800 or 1000 Da and at most about 10,000, 7500, 5000, 4000, 3000 or 2500 Da. Within the context of the present disclosure, molar mass of polymers and oligomers discussed refers to the number average molar mass ($M_n$), as for example derived from GPC measurements or by determining amount of hydroxyl (or amine) endgroups. The ratio of soft to hard blocks can be chosen to result in certain stiffness or hardness of the polymer. Typically, hardness of the polyurethane as measured with the Shore durometer hardness test using A or D scales, may be from 40 ShA, or at least 50 or 60 ShA and up to 80, 75, 70, 65 or 60 ShD or up to 100, 90 or 85 ShA, generally representing a flexural modulus range of about 10 to 2000 MPa. In embodiments, the polyurethane elastomer has a hardness from 40 ShA to 60 ShD, preferably 40-100 ShA or 40-90 ShA.

In further embodiments of the present disclosure, the polyurethane elastomer further comprises an aliphatic polyether or an aliphatic polyester as soft block, more specifically an aliphatic polycarbonate. Suitable aliphatic polyethers include poly(propylene oxide) diols, poly(tetramethylene oxide) diols, and their copolymers. Suitable aliphatic polyesters are generally made from at least one aliphatic dicarboxylic acid and at least one aliphatic diol, which components are preferably chosen such that an essentially amorphous oligomer or polymer is formed having a $T_g$ below 10, 0, or −10° C. Aliphatic polycarbonate diols are based on similar aliphatic diols as used for polyester diols, and can be synthesized via different routes as known in the art. Suitable examples include poly(hexamethylene carbonate) diols and poly(polytetrahydrofuran carbonate) diols. In an embodiment, the soft block is based on a poly(hexamethylene carbonate) diol, a poly(polytetrahydrofuran carbonate) diol, or a mixture thereof.

In embodiments, the polysiloxane soft block is derived from a poly(dimethyl siloxane) diol. In further embodiments, the soft blocks of the polyurethane are derived from a polysiloxane diol such as a poly(dimethyl siloxane) diol, and an aliphatic polycarbonate diol or a poly(tetramethylene oxide) diol. In an embodiment, the soft blocks are based on a polysiloxane diol, and a polycarbonate diol, a poly(tetramethylene oxide) diol, or a mixture thereof. In an embodiment, the soft blocks comprise a poly(dimethyl siloxane) diol and one or more of an aliphatic polycarbonate diol and a poly(tetramethylene oxide) diol. In an embodiment, the soft blocks are based on a poly(dimethyl siloxane) diol and one or more of an aliphatic polycarbonate diol and a poly(tetramethylene oxide) diol.

In embodiments, the soft blocks of the polyurethane elastomer may further comprise a $C_2$-$C_{16}$ fluoroalkyl diol or $C_2$-$C_{16}$ fluoroalkyl ether diol. In an embodiment, the soft blocks in the polyurethane backbone comprise the residue of 1H,1H,4H,4H-Perfluoro-1,4-butanediol, 1H,1H,5H,5H-Perfluoro-1,5-pentanediol, 1H,1H,6H,6H-perfluoro-1,6-hexanediol, 1H,1H,8H,8H-Perfluoro-1,8-octanediol, 1H,1H,9H,9H-Perfluoro-1,9-nonanediol, 1H,1H,10H,10H-Perfluoro-1,10-decanediol, 1H,1H,12H,12H-Perfluoro-1,12-dodecanediol, 1H,1H,8H,8H-Perfluoro-3,6-dioxaoctan-1,8-diol, 1H,1H,11H,11H-Perfluoro-3,6,9-trioxaundecan-1,11-diol. fluorinated triethylene glycol, or fluorinated tetraethylene glycol.

In embodiments, the $C_2$-$C_{16}$ fluoroalkyl diol or $C_2$-$C_{16}$ fluoroalkyl ether diol has an $M_n$ of at least 150 g/mol, at least 250 g/mol, or at least 500 g/mol. In an embodiment, the fluoroalkyl diol or fluoroalkyl ether diol has a molar mass of at most 1500 g/mol, at most 1000 g/mol, or at most 850 g/mol. In an embodiment, the $C_2$-$C_{16}$ fluoroalkyl diol or $C_2$-$C_{16}$ fluoroalkyl ether diol is present in an amount of at least 1 mass %, at least 2 mass %, or at least 5 mass %, based on the total mass of the polyurethane. In an embodiment, the $C_2$-$C_{16}$ fluoroalkyl diol or $C_2$-$C_{16}$ fluoroalkyl ether diol is present in an amount of at most 15 mass %, at most 10 mass %, or at most 8 mass %, based on the total mass of the polyurethane elastomer.

In embodiments, the polyurethane elastomer may comprise one or more hydrophobic endgroups. An endgroup is a generally a non-reactive moiety present at a terminal end of a molecule. In an embodiment, the polyurethane elastomer is linear and comprises a hydrophobic endgroup at one end or terminus, preferably at each terminus of the backbone; i.e. it has an average of about 2 endgroups. In an embodiment, the hydrophobic endgroup is a linear compound. In another embodiment, the hydrophobic endgroup is branched. An endgroup may have been formed by reaction of an isocyanate group during or after forming the polymer backbone with a co-reactive group on a monofunctional compound, also called chain stopper. For instance, a formulation for forming a polyurethane may comprise a diisocyanate, a polymeric aliphatic diol, a chain extender, and a monofunctional alcohol or amine; like 1-octanol or octylamine to form a $C_8$ alkyl endgroup.

In embodiments, the hydrophobic endgroup comprises a $C_2$-$C_{20}$ alkyl, a $C_2$-$C_{16}$ fluoroalkyl, a $C_2$-$C_{16}$ fluoroalkyl ether, a hydrophobic poly(alkylene oxide) or a polysiloxane, including their respective copolymers. In an embodiment, the hydrophobic poly(alkylene oxide) is poly(propylene oxide), poly(tetramethylene oxide) or a copolymer thereof. In an embodiment, the hydrophobic endgroup is a polysiloxane, like a poly(dimethyl siloxane) or a copolymer thereof. In embodiments, the endgroup comprises $C_2$-$C_{20}$ alkyl, $C_2$-$C_{16}$ fluoroalkyl, $C_2$-$C_{16}$ fluoroalkyl ether, or a hydrophobic poly(alkylene oxide). Such endgroups may be formed with monofunctional alcohols, including carbinols, or amines of the foregoing. Such polyurethane elastomers having hydrophobic endgroups are found to positively affect properties of the polyurethane and its interaction with other materials, including other polymers like polyolefins and bodily tissue and fluid like blood.

In an embodiment, the hydrophobic endgroup comprises $C_2$-$C_{16}$ fluoroalkyl or $C_2$-$C_{16}$ fluoroalkyl ether. Such endgroups may be formed with monofunctional alcohols or amines comprising $C_2$-$C_{16}$ fluoroalkyl or $C_2$-$C_{16}$ fluoroalkyl ether. In an embodiment, the endgroup is formed from 1H,1H-Perfluoro-3,6-dioxaheptan-1-ol, 1H,1H-Nonafluoro-1-pentanol, 1H,1H-Perfluoro-1-hexyl alcohol, 1H,1H-Perfluoro-3,6,9-trioxadecan-1-ol, 1H,1H-Perfluoro-1-heptyl alcohol, 1H,1H-Perfluoro-3,6-dioxadecan-1-ol, 1H,1H-Perfluoro-1-octyl alcohol, 1H,1H-Perfluoro-1-nonyl alcohol, 1H,1H-Perfluoro-3,6,9-trioxatridecan-1-ol, 1H,1H-Perfluoro-1-decyl alcohol, 1H,1H-Perfluoro-1-undecyl alcohol, 1H,1H-Perfluoro-1-lauryl alcohol, 1H,1H-Perfluoro-1-myristyl alcohol, or 1H,1H-Perfluoro-1-palmityl alcohol.

In an embodiment, the hydrophobic endgroup is monomeric and has a molar mass of 200 g/mol or more, 300 g/mol or more, or 500 g/mol or more; and of 1,000 g/mol or less or 800 g/mol or less. In another embodiment, the endgroup is polymeric and has a molar mass of 10,000 g/mol or less, 8,000 g/mol or less, 6,000 g/mol or less, or 4,000 g/mol or less. In an embodiment, the endgroup is polymeric and has a molar mass of 500 g/mol or more, 1,000 g/mol or more, or 2,000 g/mol or more.

In embodiments, the hydrophobic endgroup is present in an amount of at least 0.1 mass %, at least 0.2 mass %, at least 0.3 mass %, or at least 0.5 mass %, based on the total mass of the polyurethane. In an embodiment, the hydrophobic endgroup is present in an amount of at most 3 mass %, at most 2 mass % or at most 1 mass %, based on the total mass of the polyurethane. In an embodiment, the hydrophobic endgroup is present in an amount of at least 0.1 mass %, at least 0.2 mass %, at least 0.3 mass %, or at least 0.5 mass %; and in an amount of at most 3 mass %, at most 2 mass % or at most 1 mass %, based on the total mass of the polyurethane.

The hard blocks in the polyurethane elastomer or TPU are typically based on an aromatic diisocyanate like toluene diisocyanate (TDI) or methylenediphenyl diisocyanate (MDI), and a low molar mass aliphatic diol like 1,4-butanediol. Polyether and polycarbonate polyurethanes may be suitably used for biomedical applications, in view of their flexibility, strength, biostability, biocompatibility and wear resistance. TPUs containing a combination of a polyether and a polysiloxane, or a polycarbonate and a polysiloxane in the soft blocks show a unique combination of properties and may advantageously be used as the polyurethane in the composite sheet. Commercially available examples of such polymers include Carbosil® TSPCU products (available from DSM Biomedical BV, Sittard-Geleen NL).

In further embodiments, the polyurethane or TPU may be a blend of two or more polymers, which differ in composition and/or molar mass and of which at least one polymer comprises polysiloxane segments.

In other embodiments the polyurethane or TPU may comprise one or more customary additives that are allowed for the targeted use of the composite sheet; in addition to e.g. catalyst residues. Examples of additives include stabilizers, anti-oxidants, processing aids, lubricants, surfactants, anti-static agents, colorants, and fillers. The additives may be present in the typically effective amounts as known in the art, such as 0.01-5 mass % based on the amount of the polyurethane, preferably 0.01-1 mass %. In another embodiment, the polyurethane or TPU substantially consists of polymer, and is substantially free of additives. In embodiments, the polyurethane or TPU does not contain catalyst residues.

In embodiments, the composite sheet comprises biocompatible, high-strength polymer fibers and a biocompatible and biostable TPU, wherein the TPU may show at a temperature above its melting point a melt flow that is at least 10 times higher than the melt flow of the polymer. The TPU may have a melting point that is higher than the melting point of the polymer of the fibers, for example a polyolefin that may melt in a range 130-190° C. Melting point of a polymer fiber will a.o. depend on crystallinity and amount of oriented crystals present; for example high-strength polyethylene fibers, like UHMWPE fibers, show multiple melting points in a range 130-155° C. Basically, this melt flow feature means that the melt viscosity of the polymer, e.g. polyethylene, is significantly higher than the melt viscosity of the TPU at a certain temperature above the melting points of the polymer and of the TPU, for example at a temperature that may be reached during laminating the TPU and textile or during laser cutting of the composite sheet. Such difference in melt viscosities may result in the molten fiber polymer showing substantially no melt flow whereas the molten TPU may flow into the textile and/or around fibers of the textile to embed the fibers. Melt flow is typically measured as melt flow rate (MFR; also called melt flow index, MFI) following ASTM D1238 standard and reported as the amount of polymer extruded during a fixed time (that is in g/10 min) from a certain opening under a certain weight and at a certain temperature as specified for different polymers in the standard. High molar mass polyolefins, like HMWPE, typically have such high melt viscosity that a high mass is used in this test (21.6 kg vs 2.16 kg for most polymers) to have a measurable result (e.g. 0.2-1 g/10 min at 190° C. and 21.6 kg). UHMWPE grades typically have such high viscosity that there is no measurable melt flow under such conditions. In embodiments, the TPU has at said temperature above its melting point, for example at 210-240° C., a melt flow rate that is at least 10, 20, 40, 60 or even 100 times the melt flow rate of the polymer, e.g. a polyolefin like a UHMWPE. In case of fibers made from a polymer that does not melt up to a temperature of 250° C. or higher, TPU may similarly flow around fibers during laminating to form a composite sheet or laser cutting of a composite. Laser cutting as such is considered to induce very local heating of textile fibers and polyurethane matrix to such temperature that composite material degrades and evaporates by focused laser energy. The polyurethane composite may be suitable cut into smaller pieces of desired shape using a laser, to make medical implant components.

The polyurethane composite sheet according to the present disclosure contains 10-90 mass % of polyurethane as matrix polymer. The amount of polyurethane, and thus also the relative amount of textile, highly determines the properties of the composite. In case of a fabric having an open structure and low areal density, a relatively low amount of polyurethane may only coat or cover the strands and/or fibers of the textile, i.e. the coated textile may still be porous and a relatively high amount of polyurethane would be needed to result in a non-porous sheet; whereas in case of e.g. a more densely woven fabric a relatively low amount of polyurethane may already result in a non-porous composite sheet. In embodiments, the polyurethane elastomer is present in at least such amount that it fully covers and embeds the strands or fibers of the textile and the composite sheet is substantially non-porous.

In embodiments, the polyurethane composite sheet comprises a fabric having an open structure and a low areal density, and such an amount of the polyurethane elastomer that it fully covers and embeds the strands of the fabric and the composite sheet is substantially non-porous.

Depending on the type of textile and the relative amount of polyurethane, the structure of the surface of the composite sheet may vary; for example, a non-porous composite sheet may have a certain surface texture that reflects at least partly the structure of the textile, or the composite sheet may have a substantially smooth surface. In embodiments, the polyurethane composite sheet may have two surfaces that are substantially the same, or may have surfaces that differ in their texture; which is typically a result of different ways of making the composite. As interactions with biological tissue and fluids are affected by both type of polyurethane and surface texture, the composite sheet of the disclosure may have properties tuned to a certain application by the relative amount of polyurethane and its surface texture. In some embodiments, the composite sheet has a textured surface on one side of the sheet, but is substantially smooth on the other. Such composite sheets may be applied in medical devices, wherein two sides of the composite sheet are in contact with different substrates, as for example a stent graft or valve skirt contacting blood and tissue. In other embodiments, the composite sheet has two textured surfaces, and in further embodiments the composite sheet has two virtually smooth surfaces. A textured surface may also include a surface layer having pores, which pores do not extend to the opposite (smooth or textured) surface. Surface texture can be readily quantified in terms of surface roughness parameters, for example according to ISO25178 (e.g., Sa, Sz) using a 3D laser scanning confocal microscope.

In embodiments, the composite sheet has at least one textured surface characterized by a surface roughness Sa of 3-12 μm and Sz of 20-100 μm. In other embodiments, the composite sheet has two textured surfaces characterized by a surface roughness Sa of 3-12 μm and Sz of 20-100 μm, wherein one surface is less rough than the other.

In embodiments, the polyurethane amount in the composite sheet is at least 15, 20, 25, 30, 35, 40, 45, 50, 55, 60, 65, 70, 75, 80, or 85 mass % (based on total mass of the composite sheet). In general, a higher amount will result in a more flexible and elastic composite sheet, also depending on the textile structure and type of fibers contained therein. A higher relative amount of textile in the composite sheet may result in a stronger composite, showing strain hardening at lower strain. In embodiments, the polyurethane amount is at most 85, 80, 80, 75, 70, 65, 60, 65, 60, 55, 50, 45, 40, 35, 30, 25 or 20 mass %. In other embodiments, the polyurethane amount is about 25-90, 35-90, 45-90, 15-70, 20-65, 25-60, 15-55 or 20-50 mass %.

The polyurethane composite sheet according to the present disclosure contains as a textile comprising biocompatible, high-strength polymer fibers a woven or braided fabric. The fabric may be substantially isotropic or may show anisotropy. The skilled person has knowledge about various weaving and braiding methods and different characteristics of resulting fabrics; and will be able to select a suitable fabric type given a specific intended application of the composite sheet and its requirements, optionally based on some experiments.

In embodiments, the textile is a braided fabric structure. For braiding, also called plaiting, a minimum of 3 strands is needed; the simplest structure being a flat three-stranded braid. Braiding machines can process multiple strands for making more complex braided structures, like cords, hoses or types of lace. For biomedical applications, braided cords, braided tubular structures and two-dimensional or flat braided fabrics are examples of braided fabrics that can be used be used to make the composite sheets.

In other embodiments of the present disclosure, the textile in the composite sheet is a woven fabric. A woven fabric is made from two or more strands that are generally interlaced in an orthogonal pattern; wherein strands of fibers that are running in the length (or machine) direction of the woven are called warp strands and the strands running perpendicular thereto are called weft (or fill) strands. Typically, woven fabrics with commonly used patterns like plain, twill, leno, satin or basket weave patterns are found to provide good performance. Woven fabrics may have a similar number of strands in warp and weft directions and thus be substantially symmetrical and have balanced properties. On the other hand by using, for example, a different number of strands, or different types of strands in warp versus weft, a woven with anisotropic properties may be formed; to reflect for example typical properties of some natural tissue material like in a blood vessel or in leaflets of a heart valve. A woven fabric can be a flat fabric having one or more layers, or be a tubular fabric. A flat woven fabric typically has a selvedge (or selvage) at its lengthwise edges, where the weft strands that run perpendicular to the edge of the structure are not extending from the structure as free ends but are continuous at the edge by returning into the woven structure. It will, however, be dependent on the actual use in and design of an implant component whether such stable selvedge can remain and function as an edge, or whether pieces of specific shape are to be cut from a larger composite sheet. It is an advantage of a composite sheet having a continuous polyurethane matrix that pieces may be cut from the composite sheet, for example by using a laser like an ultra-short pulse laser, which cut pieces have stable edges that show good fraying resistance and suture retention strength.

A further advantage of using a woven or braided fabric as reinforcement in a polyurethane matrix, rather than locally applying reinforcing high-strength fibers, for making a composite sheet suitable for making e.g. leaflets for a prosthetic valve, is that the risk of 'cheesewiring' is significantly reduced. Such cheesewire effect may refer to high-strength fibers or filaments damaging or even cutting through the matrix upon the material being repeatedly flexed and tensioned. A fabric comprising interlaced fibers as reinforcement may similarly result in enhanced suture retention strength, in cases wherein sutures are applied to attach pieces of the composite sheet together or to other items like a skirt or stent.

In embodiments, the composite sheet comprises a fabric, such as a woven fabric, which comprises or has substantially been made from (warp and weft) strands with a titer of 2-250 dtex. The unit dtex or decitex is typically used in fiber industry, like the related US unit denier, and indicates the linear density of a fiber, strand, yarn or filament; with 1 dtex being 1 gram per 10.000 meter of fiber. The lower the titer, the lower the thickness of a strand. A fabric made from thin strands will generally be thinner and more flexible or pliable than a textile made from thick strands, although the type of strand and type of polymer in a fiber, as well as fabric type may also have some influence. In embodiments of the invention, the strands have a titer of at most 225, 200, 180, 160, 140, 120, 100, 80, 60 or 50 dtex; and of at least 4, 5, 6, 8, 10, 15, or 20 dtex. In embodiments, the at least one strand has a titer of 4-140, 6-100 or 8-60 dtex for a good balance between handleability, pliability, low profile, and strength of the fabric. The woven fabric may comprise strands of the same or different linear density. By using strands of different titer, thickness of the fabric may be varied in length and/or width direction to create local thickness or stiffness differences, or to create a certain texture, for example with a certain pattern depending on the type of weave. The skilled person will be able to select strands of suitable titer depending on desired thickness and texture of the textile.

In embodiments, the composite sheet comprises a woven fabric wherein the number of warp and weft strands per length unit of the fabric, typically expressed as ends per inch (EPI) for warp direction and as picks per inch (PPI) for weft direction, may vary widely; depending on the thickness of strands and density of the fabric. Generally, the fabric contains 25-500 strands per inch (EPI, PPI). In embodiments, the fabric contains at least 30, 40, 50, 60, 70, 80, 90 or 100 strands per inch, and at most 450, 400, 350, 300, 250, 200 or 150 strands per inch. Considering that thin and pliable fabrics are preferred for use in medical devices applied in minimally invasive operations, a woven fabric with a low number of thin strands per length unit, for example from 30 to 350 strands per inch; preferably from 50 to 250; more preferably from 100 to 200 strands per inch is preferred. Moreover, a relatively open, porous structure is preferred, for example a Leno weave or a mock Leno weave.

The difference between EPI and DPI in the woven fabric is preferably low. This leads to a low variation in flexural rigidity as measured in different directions of the composite sheet, which is a desirable property for use in heart valve leaflets amongst other applications. Typically, the difference between EPI and DPI is at most 200; preferably at most 150; more preferably at most 100 or at most 50. Expressed as a percentage, typically, the difference between EPI and DPI is at most 100%; preferably at most 80%; more preferably at most 40%; 30% or 20%.

In embodiments, the warp and weft strands of the woven fabric in the composite sheet have substantially the same titer. In such case, and especially when the number of warp and weft strands per length unit are also substantially the same, the woven fabric and the composite sheet containing such woven fabric will be balanced; that is show similar properties in warp (also longitudinal or 0°) direction and in weft (also orthogonal or 90°) direction. Typically, tensile properties in warp and weft directions of the (fabric in the) composite sheet, which will be largely determined by the polymer fibers in the fabric once strands have been straightened during initial elongation of the sheet, will be different from the tensile behavior measured in a direction or an axis at an angle with warp and weft direction; in which directions tensile elongation will also be influenced by deformation of the woven fabric and of the polyurethane matrix, especially in the initial stages of elongating. In such direction at an angle with warp and weft strands, and especially substantially between warp and weft direction (i.e. at an angle of about 30-60°, especially of about 45° with warp and weft) the composite sheet will show non-linear uni-axial tensile behavior.

In general, non-linear tensile behavior is typical for several types of natural soft tissue, such as of heart valve leaflets. In FIG. 1, taken from a publication by Hasan et al. (J. Biomechanics 47, p 1949-1963; or DOI: 10.1016/j.jbiomech.2013.09.023) such non-linear behavior is schematically represented in a stress-strain curve. Hasan refers to $E_H$ as representing the 'high elastic modulus' (hereinafter called hardening modulus), to $\varepsilon_0$ as the 'zero-stress extrapolated strain' (hereinafter referred to as hardening transition point), and to $\varepsilon_{tr}$ as the 'transition strain'. The stress-strain curve of soft tissue can be split in several phases, wherein (i) is the low stress-low strain linear elastic phase, (ii) the highly non-linear transition phase, (iii) a post-transition linear elastic region linked to elongation of oriented collagen fibers, and (iv) a non-linear phase of decreasing stress until rupture. In normal functioning of a heart, leaflets will typically be elongated about 10-15% during opening and closing of the valves; which is below said hardening transition. This is further illustrated in FIG. 2, which shows 3 stress-strain curves measured, under physiological conditions (e.g. in water at 37° C.), on test samples taken from a sheet of treated pericardium; also showing non-uniformity of such natural tissue. The hardening transition points observed for this pericardium material fall within 25-45% strain.

The polyurethane composite sheet comprises a fabric comprising biocompatible, high-strength polymer fibers. The fibers form strands of the fabric, and may be present in different forms, like as a monofilament, as a, typically twisted, multifilament yarn or as a two or more twisted or braided yarns. In embodiments, the textile consists of strands of one multifilament yarn; to enable high flexibility and low thickness of the composite.

In embodiments, the composite sheet contains a woven or braided fabric comprising at least 50 mass % of high-strength polymer fibers, and further other fibers or strands that may have different characteristics; as long as the textile conforms to the other features as described herein. In embodiments, the fabric comprises at least 10, 20, 30 or 40 mass % of high-strength polymer fibers. In embodiments, the fabric contains at least 60, 70, 80, 90, or 95 mass % of said high-strength polymer fibers, or is substantially made from or made from high-strength polymer fibers.

In embodiments, the textile in the composite sheet has a thickness of about 15-150 μm. Thickness of the textile is related to the type of strands, the type of forming technique used in making the textile and density of the textile; e.g. the distance between fibers or strands in the textile. Preferably, the textile has a thickness of at most 125, 100, 90, 80 or 75 μm for improved flexibility and pliability, and thickness of at least 20, 25, 30, 35, 40 45, or 50 μm for certain strength and durability properties. These values represent maximum and minimum thickness in case the textile has not a uniform thickness.

In embodiments, the textile in the composite sheet has an areal density of 5-150 g/m². Areal density of the textile is related to the type of strands, the type of forming technique used in making the textile and density of the textile; e.g. the distance between fibers or strands in the textile. Preferably, the textile has an areal density of at least 6, 7, 8, 9, 10 and at most 125, 100, 90, 80, 70, 60, 50, 40, 30 or 25 g/m².

The high-strength fibers in the textile may be of various different structures and be made from various biocompatible, and optionally biostable, synthetic polymers. In embodiments, the fibers are present as monofilaments or as multi-filament yarns. In case of monofilaments, a strand in a fabric is preferably formed by one monofilament, typically with a titer of 2-50 dtex. If the monofilament is thicker, the stiffness of the textile may be too high for the intended application. Preferably, a monofilament has a titer of at most 45, 40, 35 or 30 dtex for a textile with good pliability.

In other embodiments, the textile comprises or substantially consists of strands having at least one multi-filament yarn. Given above discussed dimensioning of strands in a fabric like a woven fabric, a multi-filament yarn in a fabric can also have a titer of about 2-250 dtex. The yarn preferably has a titer of at most 225, 200, 180, 160, 140, 120, 100, 80, 60 or 50 dtex; and of at least 4, 5, 6, 8, 10, 15, or 20 dtex. In some embodiments, the at least one yarn has a titer of 2-100, 4-80, or 6-60 dtex. In case a strand comprises more than one yarn, titers are chosen to meet indicated ranges for a strand. The multi-filament yarn can be twisted or non-twisted. Twisted yarns generally are easier to handle and convert into a textile, whereas untwisted yarns may result in a more pliable textile, as filaments may move and shift easier relative to one another and the cross-section of a yarn may have become more oblong or flattened in the textile. In some embodiments, the textile is made from strands that comprise non-twisted multi-filament yarn. Typically, individual filaments contained in a multi-filament yarn may have a titer per filament that varies widely; like from 0.2 to 10 dtex, or preferably 0.3-5 or 0.4-3 dtex per filament, and filaments can have a cross-section that is substantially round but also oblong or any other form.

The polyurethane composite sheet comprises a textile comprising biocompatible, high-strength polymer fibers. The fibers may be biostable or biodegradable. Within the context of the present disclosure, high-strength fibers are fibers having a tenacity at least at least 0.6 N/tex. In embodiments, the textile of the composite sheet comprises high-strength fibers with tenacity at least 0.7, 0.8, 0.9 or 1.0 N/tex. Tenacity is commonly measured on a multi-filament yarn, but may also be determined on a single filament; suitable methods are described in the experimental part. Suitable fibers have generally been made from a thermoplastic polymer, of which chemical composition may vary widely. Biocompatible thermoplastic synthetic polymers that are used in fiber making include materials like poly (meth)acrylates, polyolefins, vinyl polymers, fluoropolymers, polyesters, polyamides, polysulfones, polyacrylics, polyacetals, polyimides, polycarbonates, and polyurethanes, including copolymers, compounds and blends thereof. Such synthetic polymers may also be based on natural compounds like amino acids and/or on synthetic monomers. In embodiments, the biocompatible high-strength fibers are based on polyolefins, polyketones, polyamides, or polyesters. Suitable polyolefins include polyethylenes and polypropylenes, especially such polymers of high molar mass like high molar mass polyethylene (HMWPE) and ultra-high molar mass polyethylene (UHMWPE). Suitable polyamides include aliphatic, semi-aromatic and aromatic polyamides, like polyamide 66 and poly(p-phenylene terephthalamide). Suitable polyesters include aliphatic, semi-aromatic and aromatic polyesters, like poly(l-lactic acid) (PLLA) and its copolymers, polyethylene terephthalate (PET) and liquid crystalline aromatic copolyesters. In an embodiment, the fibers are made from PET or PLLA. Polymer fibers can be made using different fiber spinning processes as known in the art; like melt spinning and solution spinning, including special techniques like gel spinning or electrospinning.

In further embodiments, the high-strength fibers in the textile of the composite sheet have been made from one or more polyolefins selected from homopolymers and copolymers, including e.g. bipolymers, terpolymers, etc., which contain one or more olefins such as ethylene and propylene as monomer units. Such polyolefins preferably have a high molar mass and may have been formed by any method known to those skilled in the art. A high molar mass is herein understood to mean a weight averaged molecular weight (or molar mass) of at least 350 kDa, as determined by GPC or as derived from solution viscosity measurements. Suitable examples of polyolefins include polypropylenes, polyethylenes, and their copolymers or blends; like polypropylene homopolymer, medium density polyethylene, linear or high-density polyethylene, copolymers of ethylene and relatively small amounts of one or more alpha-olefins such as butene-1, hexene-1, and octene-1, linear low-density polyethylene, ethylene/propylene copolymers, propylene/ethylene copolymers, polyisoprene and the like. Polypropylene and polyethylene polymers are preferred. An advantage of such high molar mass polyolefin fibers, in addition to their good biocompatibility and biostability, is the relatively high tensile strength such fibers (both at yarn and filament level) may have; that is a tenacity of at least 1.5 N/tex, which allows making thin yet strong and durable textiles.

In further embodiments, the textile comprises fibers made from a linear polyethylene such as a high molecular weight polyethylene (HMWPE) or an ultra-high molecular weight polyethylene (UHMWPE). The old term molecular weight is still interchangeably used in the art with molar mass; also reflected in the commonly used abbreviation for (ultra-)high molar mass polyethylene. UHMWPE is a synthetic polymer that shows good biocompatibility in combination with high biostability or bio-inertness, and which is used in various biomedical devices and implants for quite some time already. UHMWPE is herein understood to be a polyethylene having an intrinsic viscosity (IV) of at least 4 dL/g, like between 4 and 40 dL/g. Intrinsic viscosity is a measure for molar mass that can more easily be determined than actual molar mass parameters like Mn and Mw. IV is determined according to method ASTM D1601(2004) at 135° C. on solution in decalin, the dissolution time being 16 hours, with butylhydroxytoluene as anti-oxidant in an amount of 2 g/L solution, by extrapolating the viscosity as measured at different concentrations to zero concentration. There are various empirical relations between IV and Mw, such relations typically being dependent on factors like molar mass distribution. Based on the equation Mw=$5.37*10^4$ [IV]$^{1.37}$ an IV of 8 dL/g would correspond to Mw of about 930 kDa, see EP0504954A1. In embodiments, the IV of the UHMWPE in the fibers is at least 5, 6, 7 or 8 dL/g and IV is at most 30, 25, 20, 18, 16 or even at most 14 dL/g; to arrive at a balance between high mechanical properties and ease of processing. In general, the IV as measured on the UHMWPE polymer in a fiber or fabric can be somewhat lower than the IV of the polymer as used in making the fibers. During a fiber manufacturing process, like the gel-extrusion method described further on, the polyolefin may be subject to thermal, mechanical and/or chemical degradation, which may result in chain breakage, lowering of the molar mass and/or different molar mass distribution.

In further embodiments of the disclosure, the UHMWPE in the fibers may be a linear or slightly branched polymer, linear polyethylene being preferred. Linear polyethylene is herein understood to mean polyethylene with less than 1 side chain per 100 carbon atoms, and preferably with less than 1 side chain per 300 carbon atoms; a side chain or branch containing at least 10 carbon atoms. The linear polyethylene may further contain up to 5 mol % of one or more other alkenes that are copolymerizable with ethylene, e.g. $C_3$-$C_{12}$ alkenes like propene, 1-butene, 1-pentene, 4-methylpentene, 1-hexene and/or 1-octene. Side chains and comonomers in UHMWPE may suitably be measured by FTIR; for example on a 2 mm thick compression molded film, by quantifying the absorption at 1375 cm using a calibration curve based on NMR measurements (as in e.g. EP0269151).

The UHMWPE in the fibers may be a single polymer grade, but also a mixture of polyethylene grades that differ in e.g. molar mass (distribution), and/or type and amount of side chains or comonomer(s). The UHMWPE in the fibers may also be a blended with up to 25 mass % of another polyolefin as described above. Generally, the UHMWPE fibers are suitable for medical applications, containing only low amounts of customary and biocompatible additives and residual spin solvent. In embodiments, the fibers contain at most 5, 4, 3 2 or 1 mass % of additives. In other embodiments, the UHMWPE fibers or at least part thereof contain a radiopacity inducing component, like particles of tantalum or $Bi_2O_3$. In such case the fibers generally contain relatively high amounts of radiopaque additive, like 15-50 mass % of sub-micron sized particulate in order to create suitable contrast in imaging techniques. In further embodiments the fibers contain at most 1000 ppm of spin solvent, preferably at most 500, 300, 200, 100 or 60 ppm.

In embodiments, the high-strength polymer fibers comprised in the textile are UHMWPE fibers having a tensile strength or tenacity of at least 1.5, 2.0, 2.5, 2.8, or 3.0 N/tex and typically of at most about 4.5, 4.0, 3.7 or 3.5 N/tex; and preferably a tensile modulus of at least 30 and up to 150 N/tex. Tensile properties like strength (or tenacity) and modulus (or Young's modulus) of UHMWPE fibers are defined and determined at room temperature, i.e., about 20° C., for example on multifilament yarn based on ASTM D885M, using a nominal gauge length of the fibre of 500 mm, a crosshead speed of 50%/min and Instron 2714 clamps, of type "Fibre Grip D5618C". Based on the measured stress-strain curve the modulus is determined as the gradient between 0.3 and 1% strain. Alternatively, tensile properties may be measured on a single filament, applying a procedure as indicated in the experimental part. For calculation of the modulus and strength, the tensile forces measured are divided by the titer, as determined by weighing 10 metres of yarns; values in MPa may be calculated from N/tex assuming a density of 0.97 g/cm$^3$ for UHMWPE fibers.

In embodiments, the high-strength polyolefin fibers comprised in the textile have been made by a so-called gel-spinning process. In a typical gel-spinning process a solution of the polymer in a suitable spin solvent, optionally containing dissolved and/or dispersed further components, is spun and cooled into gel fibers that are subsequently drawn before, during and/or after partially or substantially removing the spin solvent. Gel spinning of a solution of UHMWPE is well known to the skilled person; and is described in numerous publications, including EP0205960A, EP0213208 A1, U.S. Pat. No. 4,413,110, GB2042414 A, EP0200547B1, EP 0472114 B1, WO2001/73173 A1, WO2015/066401A1, in Advanced Fiber Spinning Technology, Ed. T. Nakajima, Woodhead Publ. Ltd (1994), ISBN 1-855-73182-7, and in references cited therein. Examples of suitable UHMWPE multi-filaments yarns for used in medical applications include those available as Dyneema Purity® grades (e.g. from DSM Biomedical BV, Sittard-Geleen NL).

The polyurethane composite sheet comprises a textile comprising biocompatible, high-strength polymer fibers. In embodiments, the textile comprises at least 80, 85, 90 or 95 mass % of high-strength UHMWPE fibers or filaments. In other embodiments, the textile, for example the warp and/or the weft strands of a woven structure, substantially consist or consist of UHMWPE fibers or multi-filament yarn.

In further embodiments, the textile may comprise more than one type of high-strength fibers, or high-strength fibers and other fibers, like elastic fibers. Such different fibers may in case of a fabric be present in some but not all strands, like in warp but not in weft or alternatively in weft but not in warp strands. In embodiments of the present disclosure, the textile is a woven fabric containing warp and weft strands of high-strength fibers and warp and weft strands of other fibers, wherein compositions in warp and weft directions are substantially the same; the fabric showing similar properties in warp and weft directions. In some embodiments, warp strands (substantially) consist of UHMWPE and weft strands (substantially) consist of another synthetic polymer like a polyester such as PET; alternatively, weft strands consist of UHMWPE fibers and warp strands of another polymer like PET. Such fabrics typically show anisotropic properties, like different strength and/or elongation in warp vs weft direction.

In other embodiments, the polyurethane composite sheet comprises a fabric that substantially consists of or consists of one type of high-strength polymer fibers.

In embodiments of the disclosure, the polyurethane composite sheet comprises
A biocompatible and biostable polyurethane elastomer comprising polysiloxane segments; and
A woven fabric substantially consisting of biocompatible, high-strength polyethylene fibers.

In an embodiment, the composite sheet of the disclosure has a thickness of 25-250 μm and an areal density of 5-300 g/m$^2$. In embodiments, the composite sheet has a thickness of about 25-200 μm. Preferably, the composite sheet has a thickness of at most 150, 125, 100, 90, 80 or 75 μm for improved flexibility and pliability, and thickness of at least 30, 35, 40 45, or 50 μm for certain strength and durability properties, and certain surface roughness. These values represent measured maximum and minimum thickness in case the sheet has not a uniform thickness.

In embodiments, the composite sheet has an areal density of 10-200 g/m$^2$. Preferably, the composite sheet has an areal density of at least 12, 14, 16, 18 or 20 and at most 150, 125, 100, 90, 80, 70, 60, 50, 40, or 30 g/m$^2$.

Although it has been described that coated woven fabrics having anisotropic properties may be suited for use in specific applications, it was surprising to the inventors to find that a polyurethane elastomer-based composite sheet with certain desired properties may be designed and obtained by selecting and optimizing a number of variables and parameters; including characteristics of the textile like type of fabric, fiber orientation, weave pattern, warp and weft densities, strand thickness, type of polymer fibers in warp and weft strands, as well as of the polyurethane elastomer, like type and amount, as discussed herein above, to result in composite sheet that has a certain thickness, areal density and flexibility; and which composite sheet shows, in at least one direction, non-linear uniaxial tensile behavior characterized by a 1%-secant modulus of 20-200 MPa, a hardening transition point at 10-45%, and a tensile strength of at least 25 MPa (in water at 37° C.).

Such polyurethane composite sheet comprising a woven fabric shows non-linear tensile properties in at least one direction, when measured in the directions oblique relative to warp and weft direction of strands in the fabric, for example when measured in directions oriented at about 45 degrees to warp or weft. It was found that relevant tensile properties may be comparable to properties of a pericardium sheet, when measured under the same physiological-like conditions; as is illustrated by results presented in FIG. 2 (for pericardium) and FIG. 3 (for Example 3); especially for the secant modulus and strain hardening. In addition, the composite sheet has a substantially higher ultimate tensile strength in any direction, and especially in warp and weft directions, than the tested pericardium; which means that when the composite sheet is used for example as leaflets of a prosthetic valve the maximum stress level on the material in use will remain far below the stress that could lead to rupture. Several scientific publications have shown that in such case a material will show enhanced fatigue behavior versus material that is subject to stress levels close its ultimate strength. Therefore, significant improvement in durability of a prosthetic valve having leaflets made from the polyurethane composite sheet according to present disclosure over prior art bioprosthetic and synthetic valves may thus be expected.

In exemplary embodiments, the polyurethane composite sheet comprises as textile a woven fabric having the high-strength fibers in warp and weft strands, and has a tensile strength at least in directions about 45° relative to warp and weft strands of at least 30, 35, or 40 MPa, and in other embodiments at least such tensile strength in any direction. There is no specific limitation to tensile strength, but in embodiments the tensile strength is at most about 400, 350 or 300 MPa.

In embodiments, the polyurethane composite sheet comprises as textile a woven fabric having the high-strength fibers in warp and weft strands, and has a 1%-secant modulus in directions about 45° relative to warp and weft strands of at least 25 MPa, and of at most 190, 170, 150, 130, 110, 90, 70 or 50 MPa.

In other embodiments, the polyurethane composite sheet comprises a woven fabric with high-strength fibers in warp and weft strands as textile, and has a hardening transition point in directions about 45° relative to warp and weft strands of at least 11, 12, 13, 14, or 15%, and of at most 42, 40, 38 or 36%.

In an embodiment, the polyurethane composite sheet of the disclosure comprises 10-90 mass % of a biocompatible and biostable polyurethane elastomer comprising polysiloxane segments; and a woven or braided fabric comprising biocompatible, high-strength polymer fibers. The composite sheet may further comprise one or more auxiliary components; like one or more compounds selected from antibiotics; pharmacological agents to inhibit graft (re-)stenosis (e.g. paclitaxel); thrombosis inhibiting substances, which may chemically or otherwise link to a surface (e.g. heparin, or similar naturally derived or synthesized anti-coagulating agents); other biologics and small molecules to illicit a desired biological response; and radiopacifying agents. Such optional auxiliary compounds preferably have been approved for the targeted application by regulatory bodies like FDA; and may typically be present in relatively small, effective amounts, such that their concentration in the composite sheet is effective for its purpose and within approved ranges, yet without unacceptably deteriorating other performance properties of the composite sheet. Typically, said compounds are present up to a level of about 5 or 2 mass %; except in case of a radiopacifying compound, of which a higher relative amount is needed for effectively enhancing medical imaging contrast.

The flexural properties of a material that is to be used as for example a leaflet in a heart valve prosthesis are important for efficient opening and closing, affecting for example the flow of blood. Typically, fiber reinforced heart valve leaflets have an undesirably high rigidity. Therefore, in an embodiment, a material with a relatively low flexural rigidity is provided. In addition, in an embodiment, a material with a low variation in flexural rigidity as measured in different directions, for example orthogonal directions, is provided. This allows for heart valve leaflets to be made wherein orientation of the material is not critical to opening and closing of the valves.

The highest flexural rigidity/unit width of the polyurethane composite sheet is typically at most 45 Nm. Preferably, it is at most 40 Nm; more preferably at most 35 Nm; yet more preferably at most 30 Nm; 20 Nm, 15 Nm; 10 Nm; 5 Nm; or even at most 2 Nm. The lowest flexural rigidity/unit width of the polyurethane composite sheet is typically at least 0.1 Nm. Preferably it is at least 0.2 Nm; more preferably at least 0.5 Nm; 1 Nm or even 1.5 Nm.

In an embodiment, the largest difference in flexural rigidity/unit width of the polyurethane composite sheet as measured in any two orthogonal directions is at most 20 Nm. In other words, all measurements of the flexural rigidity/unit width of the polyurethane composite sheet that are taken 90 degrees apart will differ by at most 20 Nm. Preferably, it is at most 15 Nm; more preferably, at most 10 Nm; yet more preferably at most 5 Nm; most preferably at most 3 Nm. Typically, the smallest difference in flexural rigidity/unit width of the polyurethane composite sheet as measured in two orthogonal directions is at least 1 Nm; preferably at least 2 Nm. In an embodiment, the largest difference in flexural rigidity/unit width of the polyurethane composite sheet as measured in any two orthogonal directions is less than 60% of the higher measurement. Preferably, it is at most 50% of the higher measurement; more preferably at most 40%; 30%; 20% or even 10% of the higher measurement. For example, if a measurement taken at 0° is 50 Nm and a measurement taken at 90° is 15 Nm, the difference is 70%.

In an embodiment, the largest difference in flexural rigidity/unit width of the polyurethane composite sheet as measured in any two directions 45° apart is at most 20 Nm. Preferably, it is at most 15 Nm; more preferably at most 10 Nm; yet more preferably at most 5 Nm; most preferably at most 3 Nm. Typically, the smallest difference in flexural rigidity/unit width of the polyurethane composite sheet as measured in any two directions 45° apart is at least 1 Nm; preferably at least 2 Nm. In an embodiment, the largest difference in flexural rigidity/unit width of the polyurethane composite sheet as measured in any two directions 45° apart is less than 60% of the higher measurement. Preferably, it is at most 50% of the higher measurement; more preferably at most 40%; 30%; 20% or even 10% of the higher measurement.

In an embodiment, the largest difference in flexural rigidity/unit width of the polyurethane composite sheet is at most 20 Nm for each of i) the warp direction) (0°) relative to an angle of 45° with respect to warp and weft and ii) the weft direction) (90°) relative to an angle of 45° with respect to warp and weft. Preferably, the largest difference in flexural rigidity/unit width of the polyurethane composite sheets is at most 15 Nm; more preferably, at most 10 Nm; yet more preferably at most 5 Nm; most preferably at most 3 Nm. Typically, the smallest difference in flexural rigidity/unit width of the polyurethane composite sheet is at least 1 Nm for each of i) the warp direction) (0°) relative to an angle of 45° with respect to warp and weft and ii) the weft direction) (90°) relative to an angle of 45° with respect to warp and weft; preferably at least 2 Nm. In an embodiment, the largest difference in flexural rigidity/unit width of the polyurethane composite sheet is less than 60% of the higher measurement for each of i) the warp direction) (0°) relative to an angle of 45° with respect to warp and weft and ii) the weft direction) (90°) relative to an angle of 45° with respect to warp and weft. Preferably, the largest difference in flexural rigidity/unit width of the polyurethane composite sheet is at most 50% of the higher measurement; more preferably at most 40%; 30%; 20% or even 10% of the higher measurement.

In embodiments, the polyurethane composite sheet of the disclosure comprises:
  10-90 mass % of the biocompatible and biostable polyurethane elastomer;
  90-10 mass % of the fabric comprising biocompatible, high-strength polymer fibers; and
  0-25 mass % of one or more auxiliary components, preferably 0-5 or 0-2 mass %.

Herein the components may be as described herein above for the polyurethane, for the fabric and for the auxiliary compounds, including all variations and options as disclosed in embodiments for respective components and in any possible combination thereof; unless indicated otherwise or physically not feasible.

The polyurethane composite sheet is biostable and biocompatible, and shows excellent hemocompatibility. In a co-pending application, which meanwhile has been published as WO2020/178228A1, results of hemocompatibility testing, using a Chandler Blood Loop in vitro model and human blood, demonstrated that polyurethane-coated UHMWPE wovens, based on similar materials as disclosed herein, show superior hemocompatibility over a PET fabric that is frequently used in blood contact applications like stent-grafts.

A further advantage of the polyurethane composite sheet of the present disclosure is that a sheet may be cut into a plurality of pieces using different methods like a blade, scissors or a laser, to result in pieces with stable cut edges. In embodiments, pieces of composite sheet that have been cut using a pulsed laser, like an ultra-short pulse laser are provided, which pieces have well-defined stable cut edges, with high fraying resistance and suture retention strength; as also reported in WO2020178228A1 for composite sheets of similar composition.

In accordance with another aspect, the present disclosure provides a method of making the polyurethane composite sheet, which method comprises steps of:
a) Providing a textile being a braided or woven fabric comprising biocompatible, high-strength polymer fibers;
b) Optionally activating the surface of the textile by pre-treating with a high-energy source;
c) Embedding the textile with a biocompatible and biostable polyurethane elastomer comprising polysiloxane segments;
to result in a composite sheet that comprises 10-90 mass % of polyurethane, has a thickness of 25-250 μm and an areal density of 5-300 g/m$^2$; and wherein
the composite sheet has, in at least one direction, non-linear uniaxial tensile behavior characterized by a 1%-secant modulus of 20-200 MPa, a hardening transition point at 10-45%, and a tensile strength of at least 25 MPa.

In step a) of the method of the disclosure, a textile is provided as described herein above for the polyurethane composite sheet, including all variations and options as disclosed in embodiments thereof and in any possible combination, unless indicated otherwise or physically not feasible. In embodiments of the present disclosure, the textile is substantially flat, such as typically resulting from a textile making process like weaving. In other embodiments, the textile has been made in a shaped, like curved, form. Examples of a shaped textile include a tubular structure, like a tubular braided or woven fabric, a 3-D woven fabric, or a woven or braided fabric that has subsequently been thermally shaped using a mold or mandrel.

The method of the present disclosure comprises the optional step b) of pretreating the surface of the textile with a high-energy source to activate the surface. Such treatment especially aims to improve bonding of the fibers in the textile to a polyurethane, but may simultaneously also clean the surface of the textile, i.e. of at least part of the fibers. Many synthetic polymer fibers, especially polyolefin fibers, have a relatively non-polar and non-reactive surface, to which more polar polymers like some polyurethanes may show not sufficient adhesion to make a composite having high durability under continuously changing load conditions without providing such pretreatment.

In embodiments, the method comprises the step b) of surface activation. Such surface activation may be done by for example a plasma or a corona treatment, as are known in the art, and may introduce functional groups like oxygen-containing groups. Suitable examples of plasma surface treatments include cold plasma treatments, which can be performed at atmospheric or reduced pressure and at a temperature that does not negatively affect the polymer fibers of the textile, for example such treatment with oxygen being present.

In an embodiment, the pretreatment step comprises atmospheric plasma activation or a corona treatment. In an embodiment, the pretreatment step is performed to activate substantially all surface of the textile, to enhance adhesion of the fibers to the polyurethane. The skilled person will be able to assess whether a pre-treatment is needed and to which extent, dependent on the polymer fiber and its interaction with the polyurethane to be used; possibly assisted by some experiments. The inventors observed that for example in case of a textile made from a non-polar polymer like a polyolefin, the combination of a surface pretreatment and embedding the pre-treated textile in a polyurethane having hydrophobic segments or endgroups as matrix polymer, contributes to the favorable performance of the composite sheet made.

In step c) of the present method, the textile is embedded in a biocompatible and biostable polyurethane elastomer. This step may be performed in different ways, for example by laminating the textile with one or more thermoplastic polyurethane films or by coating the textile using a polyurethane composition like a solution of polyurethane. In general, the textile, i.e. the fibers therein, is not specifically tensioned during such step, but the textile may optionally be mounted in a frame to prevent e.g. unwanted deformation like creasing. Similarly, the textile may be mounted in a frame for the pre-treatment of optional step b). The polyurethane elastomer used herein is as described herein above for the polyurethane composite sheet, including all variations and options as disclosed in embodiments thereof and in any possible combination, unless indicated otherwise or physically not feasible In embodiments, step c) is done by a lamination technique; for example by making a stack of at least two thermoplastic polyurethane elastomer films and the textile, with the textile preferably between polyurethane films, and compressing the stack, for example using a platen press and a mold, while heating at a temperature above the melting point (or softening point) of the polyurethane and below the melting point of the polymer fibers; such that the polyurethane substantially covers and encapsulates the fibers in the fabric. The mold may be flat or have a certain shape, to result in a substantially flat or shaped composite sheet. As polyurethanes typically absorb moisture from the environment like up to several mass %, the polyurethane elastomer is preferably dried before laminating, optionally at elevated temperature and/or under an inert gas flow or under reduced pressure; e.g. to a moisture level of less than 0.05 mass %. Such drying process is known to a skilled person.

In other embodiments, step c) is performed by using a coating technique to apply a coating composition to the textile; for example by solution coating with a coating composition comprising the biocompatible and biostable polyurethane elastomer, a solvent for the polyurethane, and optionally auxiliary compounds. The polyurethane elastomer component may be a thermoplastic polymer or a composition that forms a thermoset during or after the coating step; but the polyurethane elastomer is soluble in a suitable solvent. An advantage of solution coating vs melt laminating is that a polyurethane solution of relatively low viscosity can be used to impregnate and embed the textile at a temperature well below the relaxation, softening or melting temperature of the polymer of the fibers. Coating at low temperature prevents deteriorating fiber and/or textile properties by partial melting; considering that the melting point of a polymer like a polyolefin may be below the melting point of a thermoplastic polyurethane elastomer (TPU). Use of a solution of a polyurethane elastomer or a TPU to embed the textile also has the advantage that by choosing conditions and solution viscosity the amount of polyurethane and extent of fiber wetting and impregnation can be controlled.

In embodiments, step c) of the method comprises a step c1), wherein the textile is pre-wetted with the solvent used in the coating composition, followed by a step c2) of coating with the coating composition. Such pre-wetting with solvent is found to improve wetting behavior of the polyurethane-containing coating solution and impregnation of the textile.

The coating composition may be applied to one side of the textile, or to both sides; depending a.o. on the viscosity of the coating composition which composition should penetrate in and optionally through the textile to coat the fibers therein. In case the polyurethane solution is applied to only one side of the textile, surface properties of the side to which the solution is applied may be different than of the opposite side. For example, the relative amount of polyurethane may differ to result in one side being smoother than the other more textured side. Such composite sheet with different surface textures may show different interactions with biological matter; for example the 'smooth' side may show good blood compatibility without causing clotting, whereas at the 'textured' side having a more rough surface, optionally with pores in a top layer, ingrowth of tissue may occur when used as a graft material. Generally, the polyurethane coating composition is applied to all surface area of both sides of the textile, but may also be applied to all surface area of one side and locally at selected parts of the surface of the opposite side of the textile.

Before making the coating composition the polyurethane elastomer is preferably dried, to remove moisture present, which was typically absorbed from the environment, like up to several mass %. Drying of polyurethanes is known to a skilled person, and may be done at elevated temperature and/or under an inert gas flow, and/or under reduced pressure; e.g. to a level of less than 0.05 mass %.

The coating composition applied in the present method comprises a solvent for the polyurethane. A suitable solvent for polyurethane can substantially, or preferably homogeneously dissolve the polyurethane; but the polymer of the fibers in the textile is not soluble in the solvent, at least not under the conditions of performing the present coating/impregnating method. The person skilled in the art will be able to select a suitable solvent for a given combination of polyurethane elastomer and polymer based on his general knowledge, optionally supported by some literature; for example based on solubility parameters of solvents and polymers, which are for example given in the "Polymer Handbook" by Brandrup and Immergut, Eds. The skilled person is also aware of effects of polymer molar mass on solubility. For a so-called good solvent for a polyurethane elastomer including a TPU, interactions between polymer chain and solvent molecules are energetically favorable, and difference between solubility parameters of polymer and solvent is small. In the present case of finding a solvent for the polyurethane that is a non-solvent for the polymer, the skilled person may also perform some dissolution experiments, including stirring or sonication and optionally by applying some heating.

In embodiments of the method, the solvent may be tetrahydrofuran (THF), methyl-tetrahydrofuran (m-THF), dimethylformamide (DMF), dimethylacetamide (DMAc), dimethylsulfoxide (DMSO), dichloromethane, chloroform, hexafluoro isopropanol, dioxane, dioxolane, mixtures thereof, or mixtures thereof with other less good solvents (or co-solvent), provided such mixtures can dissolve the polyurethane. In view of removing the solvent after application from the textile, a solvent having such volatility that solvent can be substantially removed by evaporation, optionally by heating to a temperature at least 10° C. below the melting point of the polymer and polyurethane, is preferred. In an embodiment, THF or m-THF is used as the solvent, preferably THF is the solvent.

The concentration of polyurethane elastomer in the coating composition applied in the solution coating step is not critical and will generally be in the range of 0.1-20 mass % of polyurethane in solution. It was observed in experiments, however, that for good penetration of coating composition in voids or pores between strands or fibers of the textile, i.e. to impregnate the textile, a solution of relatively low viscosity is preferably used. On the other hand, the higher the polyurethane concentration the less solution needs to be applied for efficient embedding. In embodiments, the solution of elastomer may have a Brookfield viscosity of about 1-5000 mPa·s, or a viscosity of at least 5, 10, 25 or 50 mPa·s and at most 3000, 2000, 1000, or 500 mPa·s.

The coating composition may further contain one or more auxiliary compounds, like, antibiotics, pharmacological agents to inhibit graft (re-)stenosis (e.g., paclitaxel), thrombosis inhibiting substances (e.g., heparin, or similar naturally derived or synthesized anti-coagulating agents), other biologics and small molecules to illicit a desired biological response, or radiopacifying agents. Such optional auxiliary compounds preferably have been approved for the targeted application by regulatory bodies like FDA; and may typically be present in relatively small, effective amounts, such that their concentration in the composite sheet is effective for its purpose and within approved ranges, yet without unacceptably deteriorating other performance properties of the composite sheet.

In some embodiments, the coating composition further comprises a radiopaque compound as additive, typically at a relatively high amount like 15-80 mass % based on polyurethane; for effective visualization of the composite sheet with medical imaging techniques using x-rays or other radiation. In an embodiment, the radiopacifier comprises tantalum, gold, platinum, tungsten, iridium, platinum-tungsten, platinum-iridium, palladium, rhodium, barium sulfate, bismuth subcarbonate, bismuth oxychloride, bismuth trioxide, ionic or non-ionic contrasting agents such as diatrizoates, iodipamide, iohexyl, iopamidol, iothalamate, ioversol, ioxaglate, and metrizamide, or a combination thereof. In an embodiment, the radiopacifier comprises tantalum, gold, platinum, tungsten, or a mixture or alloy thereof. In an embodiment, the radiopacifier is present as particles dispersed in the coating composition, for example made by dispersing particles in a solution of polyurethane. In an embodiment, the radiopacifier particles have an average particle diameter of at least 1 nm, preferably at least 5, 10, 25, 50, 100, or 200 nm. In an embodiment, the radiopacifier particles have an average particle diameter of at most 3 μm, preferably at most 2, 1, 0.5, or 0.2 μm. Average particle diameter can be measured using photon correlation spectroscopy (PCS) in accordance with ISO13321:1996. In an embodiment, the radiopacifier is surface treated with an adhesion promoter to enhance adhesion to the polyurethane; like with a glycidyl methacrylate (GMA) modified random ethylene/acrylate copolymer, or a GMA and maleic anhydride (MA) modified random ethylene/acrylate copolymer. In an embodiment, the radiopacifier is present in the coating composition in an amount of at least 20, 25, 30, or 35 mass %; and of at most 75, 70, 65, 60, 55 or 50 mass % as based on polyurethane.

Solution coating methods as such are well known to a skilled person. Coating to embed the textile in polyurethane can be performed using various application techniques, like using a pipette or a syringe, dip-coating, spray coating, ink jet application, or screen-printing; or a continuous method like a roll-coating processes and the like in case of a textile substrate on a roll. The skilled person can select the method most suitable for an actual situation and type of textile, based on common knowledge and some routine testing. The coating composition may be applied in one step, but also in multiple steps applying e.g. smaller amounts, for example with certain time between steps to allow the solution to at least partially dry.

The step c) of embedding by coating of the present method also comprises removing the solvent from the coated textile, preferably the solvent is substantially completely removed. A simple and preferred way is to evaporate the solvent (or solvent mixture). This may be performed at ambient conditions, but also by applying a reduced pressure and/or an elevated temperature to enhance efficiency. If an increased temperature is used, care should be taken to prevent deterioration of properties of the composite sheet, for example caused by partial melting and/or stress relaxations of the polymer fibers in the textile. Preferably, the temperature applied remains well, for example at least 10° C., below the melting temperature of the polyurethane or TPU and of the polymer. Optionally, or alternatively, a washing step can be applied to substantially remove the solvent. Washing can be done with a liquid comprising or consisting of a wash solvent that is a non-solvent for both the polyurethane and the polymer, but which is miscible with the solvent for the polyurethane. Such washing step can be performed at ambient temperature, but also at elevated temperature with similar constraints as indicated above. Solvent removal is typically performed to result in a residual solvent level of the composite sheet that is in accordance with specifications or regulations for use in a medical implant. In an embodiment, the composite sheet as obtained has a residual solvent content of less than 50 ppm; for example, after drying under nitrogen for 24 hours followed by drying in a convection oven at 50° C. for one hour.

In embodiments of the method, the textile, especially a relatively small piece of textile, may be mounted in a holder or frame to keep the textile in its form, e.g. even and flat, without notably tensioning the strands of the textile, and then be subjected to pretreating, solution coating and removing solvent. Advantages hereof may include more evenly pretreating and coating the textile, as well as preventing shrinkage, or deformation like wrinkling during e.g. coating and solvent removing steps. The skilled person will be able to select a suitable frame or alternative method of preventing the textile from deforming without hindering for example effectively coating at desired locations.

Further aspects concern the use of the polyurethane composite sheet of the disclosure, including all the variations and options for the composite sheet as described in embodiments herein above and in any possible combination unless indicated otherwise or physically not feasible, in making a medical implant component suitable for an implantable medical device and the use of such medical implant component in making an implantable medical device. In embodiments thereof, said uses concern (a method of) making one or more leaflets for a prosthetic heart valve, and making a prosthetic heart valve comprising one or more of such leaflets.

In embodiments, a method of making a medical implant component from the polyurethane composite sheet comprises a step of cutting pieces of a desired shape from the sheet. Such cutting may be done by known methods, like by using a blade, scissors, or by laser cutting.

In embodiments, making a medical implant component from the polyurethane composite sheet comprises cutting one or more pieces by using a laser, which allows making a piece of material of complex shapes while having a stabile cut edge showing good fraying resistance and suture retention strength. A suitable laser for such purpose is selected and applied with such settings that enough energy is provided at the location to make cut through the composite sheet, whereby optionally a local cutting temperature may be reached that is above the melting point of the polyurethane, especially a TPU; such that the TPU locally may form a melt that flows to connect cut fiber ends with each other and/or with other fibers in the composite sheet. The laser cut itself is likely resulting from very localized heating of polyurethane and fibers to such temperature that material rapidly degrades and evaporates by the focused laser energy. To such effect, laser settings are selected such that no excessive heating occurs, to prevent forming of an irregular and deformed or disrupted edge zone adjacent to the cut in the composite sheet. An overheated edge may also show undesirable stiffening at the edge zone, deteriorating pliability of the sheet. The skilled person will be able to select a laser suitable for said purpose, like a $CO_2$, Nd or Nd-YAG laser, and to select proper settings including controlling the energy of the beam by e.g. pulsing. Generally, a $CO_2$ laser can be suitably used for cutting the composite sheet. It has been observed, however, that when using a continuous wave laser excessive heat-transfer in the composite sheet may occur, thereby distorting the cut edge or causing partial melting or shrinkage of the polymer fibers, and therewith of the sheet, due to e.g. thermal relaxation effects.

In embodiments of the disclosure, a pulsed laser is applied for cutting pieces from the composite sheet; that is a laser that emits light not in a continuous mode, but rather in the form of optical pulses. Therefore, in embodiments short pulse or ultra-short pulse (USP) lasers, like nano-, pico-, or femtosecond pulsed lasers, are applied; as they do not excessively heat the composite sheet which could cause morphological distortion, while the polyurethane may still melt to secure the cut edge. In exemplary embodiments, especially wherein the composite sheet contains polyolefin fibers like UHMWPE fibers, a cut is made with an USP laser applying an energy level setting of about 10-26 W, preferably of 12-24 or 14-22 W. In further embodiments, a cut is made applying a cutting speed of 1-12 mm/s, preferably 2-10 or 3-8 mm/s. More than one scan with an USP laser may be needed to cut completely through the composite sheet, for example depending on its thickness. In order to prevent damage to the composite sheet and resulting medical implant component, multi-step cutting may be preferred over use of higher energy settings.

In other aspects, uses of the polyurethane composite sheet of the present disclosure, or of pieces cut therefrom, include applications wherein the composite sheet will be in contact with body tissue and/or body fluids, such as in orthopedic applications including tissue reinforcement materials or in cardiovascular applications. Examples of materials for soft tissue reinforcement include meshes for hernia repair and abdominal wall reconstruction. Cardiovascular applications include devices and implants, like vascular grafts, stent covers, occlusion devices, artificial arteries, surgical meshes, valves like venous or heart valves, and introducer sheaths used in e.g. transcatheter procedures. The composite sheet may be applied as a component of said devices such that the direction or axis wherein the sheet has non-linear tensile properties is oriented in line with the direction in use wherein elastic extension and retraction is desired under applied stresses. In many of such applications the implant component needs to be connected or attached to other parts of a device or to surrounding soft or bone tissue. It is a further advantage of the present polyurethane composite sheet that various techniques may be applied to make such connections. Suturing, for example, to attach pieces of composite sheet together and/or to a stent, like three pieces forming an assembly of leaflets in a support frame may be performed with reduced risk of the suture cutting through the material when tensioned. The polyurethane composite sheet may in addition also connected by gluing; wherein the polyurethane matrix itself can at least partly act as a thermoplastic glue that can be activated by local heating, as by a laser.

Other aspects of the disclosure include such medical devices or implants as indicated above, which comprise said polyurethane composite sheet or said medical implant component. Such medical devices include aortic grafts for abdominal or thoracic aortic aneurysm, venous valves for venous insufficiency, total artificial heart devices, ventricular assist devices, peripheral stent grafts, arteriovenous (AV) grafts, cardiac or vascular patch materials for surgical use, hernia meshes, surgical barrier materials, and other general cardio-thoracic applications.

The use of the terms "a" and "an" and "the" and similar referents in the context of describing the invention (especially in the context of the following exemplary embodiments and claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, and each separate value is incorporated into the specification as if it were individually recited herein. The use of any and all examples, or exemplary language (e.g., "such as" or "like") provided herein, is intended merely to better illustrate the invention and does not pose a limitation on the scope of the invention unless otherwise claimed. No language in the specification should be construed as indicating any non-claimed element as essential to practicing the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. While certain optional features are described as embodiments of the invention, the description is meant to encompass and specifically disclose all combinations of these embodiments unless specifically indicated otherwise or physically impossible.

The experiments and samples below further elucidate embodiments of the invention, but of course, should not be construed as in any way limiting the scope of the claims.

Examples and Comparative Experiments

Materials

The following polyolefin woven fabrics, made from a medical grade, low-denier UHMWPE multi-filament yarn as warp and weft strands (Dyneema Purity® TG 10 dtex; available from DSM Biomedical BV, Sittard-Geleen NL), were used as reinforcing material in experiments:
  woven fabric with 2*2 twill weave pattern, of 45 mm flat width and thickness of about 70 μm;
  woven fabric with plain weave pattern, of 45 mm flat width and thickness of about 62 μm;
  woven fabric with mock leno weave pattern, of 45 mm flat width and thickness of about 79 μm.

The following commercially available polyester woven fabrics (Secant Group, PA, USA), comprising polyethylene terephthalate (PET) multi-filament yarns of 20-60 decitex as warp and weft strands, were used as reinforcing material in experiments:
  Low profile PET medical woven fabric with a plain weave pattern and approximate thickness of 72 μm;
  Low profile PET medical woven fabric with a plain weave pattern and approximate thickness of 93 μm;
  Low profile PET medical woven fabric with a plain weave pattern and approximate thickness of 122 μm.

As polyurethane, CarboSil® TSPCU 20-80A was used (available from DSM Biomedical BV, Sittard-Geleen, NL); a thermoplastic silicone polycarbonate polyurethane elastomer, having silicone endgroups, hardness 80 ShA, and MFR 52 g/10 min (1.20 kg/224° C.).

As alternate reinforcement a biaxially-stretched, microporous UHMWPE film, Solupor® 7P03A (obtained from Lydall Performance Materials, Heerlen, NL) was applied. This membrane is indicated to have thickness of 50 μm, porosity of 86% and mean flow pore size of 0.3 μm.

A treated (cleaned, devitalized and glutaraldehyde-crosslinked) porcine pericardium material was used as reference material.

Methods

Solution Preparation

Polyurethane solutions were prepared by dissolving CarboSil® TSPCU 20-80A in THF (Lichrosolve). Polyurethane pellets were first dried at 70° C. for up to 72 h. to remove moisture before solution preparation. Polyurethane concentrations ranging from 8-12 mass % were dissolved in THF by stirring overnight at room temperature.

Solution Viscosity

Solution viscosity at 25° C. was determined with a Brookfield DV-E viscometer with UL-adaptor and ULA-49EAY spindle, which is calibrated using silicone-based viscosity standards (Benelux Scientific). Viscosities used in the experiments ranged from 180-500 mPa·s.

Dip-Coating

Samples of about 10-25 cm length were cut from the continuous woven UHMWPE fabrics (or membrane); and mounted in a frame as sample holder. The UHWMPE samples were cleaned by spraying and wiping the sample using heptane, and dried at ambient temperature. Fabric samples cut from woven PET were similarly prepared and cleaned. Framed samples were pretreated by plasma activation during 60 s in a 15% oxygen atmosphere at 200 mTorr and 450 W.

Dip-coating was performed at ambient conditions by submersing a framed sample in a polyurethane solution and removing the sample with take-up speed of 0.1 m/sec; followed by drying at 40° C. for 20 minutes.

Sheet Thickness

Thickness of a fabric or composite sheet was measured using a Helios Preisser Electronic Outside Micrometer, with measuring range 0-25 mm (±0.001 mm).

Tensile Properties

Porcine pericardium, crosslinked in glutaraldehyde solution, and polyurethane were tested following ISO527-2 and using a test sample geometry 1BB according to the standard. For composite sheets with fibers embedded in matrix material, test sample specimens were cut with dimensions of 20 mm gauge length and 5 mm gauge width. Test samples were cut from the materials at 0, 45 and 90 degrees angle (relative to warp direction in case of woven fabrics, and to machine direction for film). Displacement rate for ISO527-2 and straight edged test samples was 25 mm/min and 41.5 mm/min, respectively; with samples being pre-loaded with 0.05 N prior to starting the test. All tensile testing was performed in a water bath at 37° C., with all samples except porcine pericardium conditioned in water at 37° C. for a minimum of 1 h prior to testing. Porcine pericardium was conditioned for 1 h prior to testing in phosphate buffered saline (pH 7.4). Strain was determined via machine displacement as optical tracking was not available for under water measurements.

Figure 2:
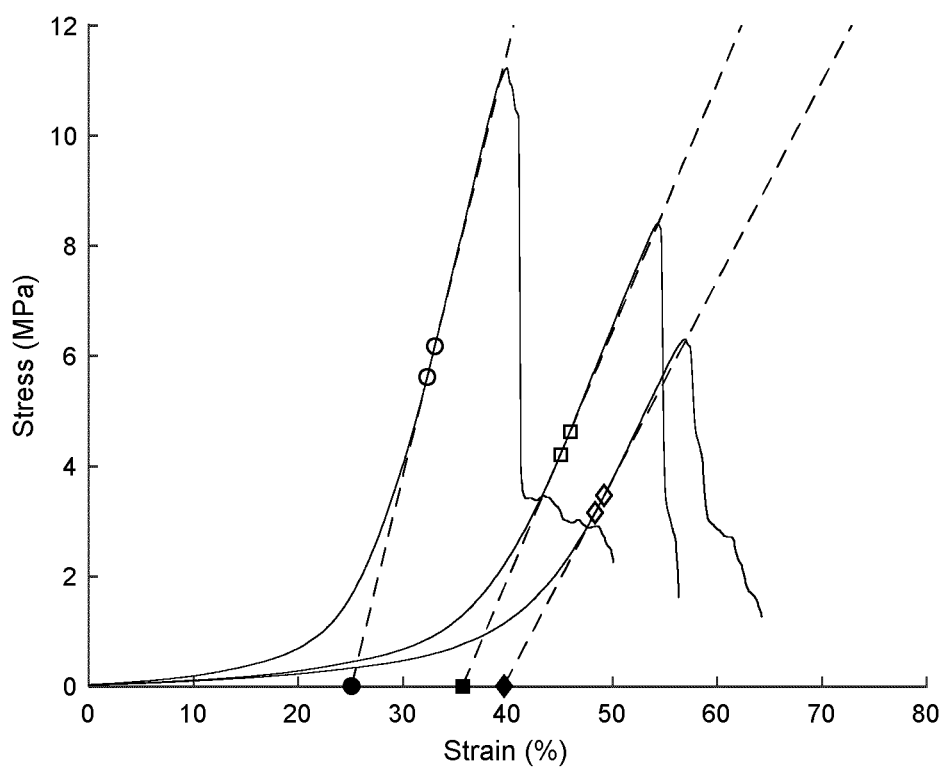
FIG. 2 represents stress-strain curves measured on test samples cut from a sheet of treated pericardium.
Figure 3:
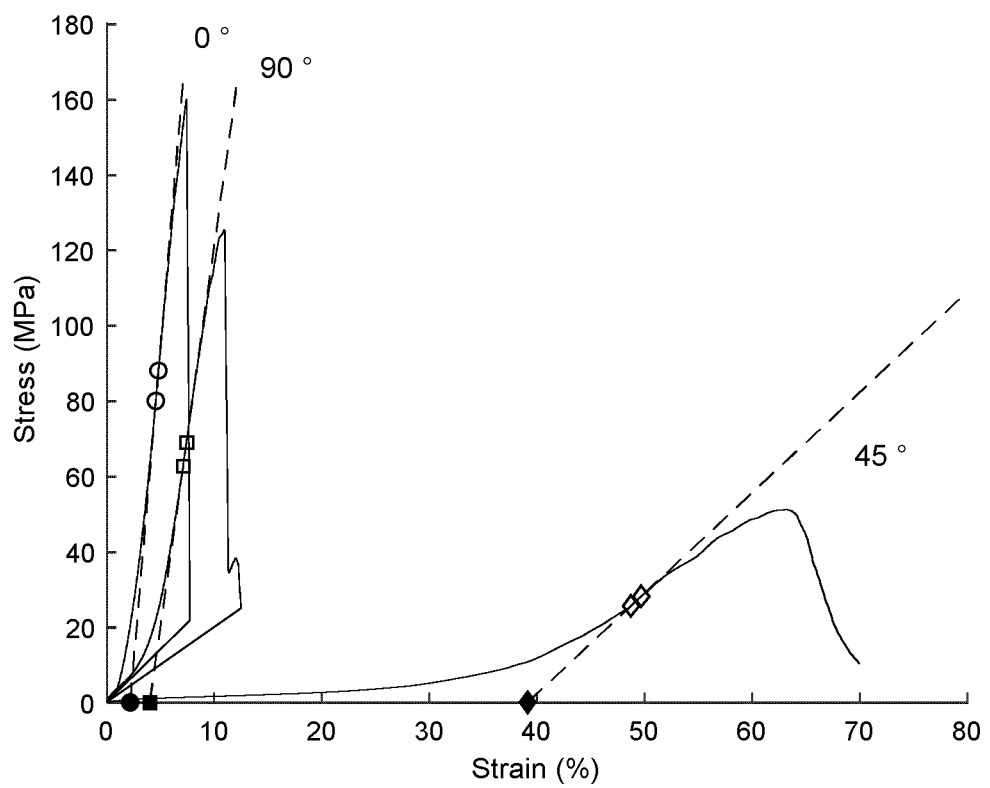
FIG. 3 shows stress-strain curves measured on the polyurethane composite based on a woven fabric of Example 3; in warp direction (0°), weft direction (90°), and at angle of 45° with warp and weft.

The 1% secant modulus is calculated from the measured stress at 1% strain; the hardening modulus is determined from a linear fit between strain at 50% and at 55% of maximum stress (see for example FIG. 2 or 3). The hardening transition point is determined as the 0 stress extrapolated strain; i.e. by extending the hardening slope to cross 0 stress; which is taken as a reproducible indicator of strain hardening occurring. The obtained value may be negative, if the initial secant modulus is much higher than the hardening modulus.

Flexural Rigidity

Flexural measurements were performed by bending sample material with a custom fixture within an Ares 2 rheometer, as described by Sachs and Akkerman (DOI: 10.1016/j.compositesa.2017.05.032). Especially for thin composite plies, the fixture applies a constant rotational speed to perfectly bend the material, measuring the applied moment as a function of rotation angle. A setup as indicated in FIG. 1F of Sachs was used. Between the sample and the fixture, a PTFE spacer was utilized to reduce friction. The thickness of the spacer was optimized per sample to minimize the gap between the fixture and the sample. Sample dimensions were 25 mm width by 35 mm length. Of the 35 mm, 10 mm of each end of the sample was placed within the fixture, providing an initial gauge length of 15 mm for bending. Tests were performed at ambient room temperature conditions. The applied moment, M, is directly related to flexural rigidity, EI, by the known curvature, κ, that was applied via the custom fixture. Flexural rigidity is defined as the flexural modulus E, multiplied by the 2nd moment of area about which bending occurred; that is $$\frac{M}{\kappa} = EI.$$

All measurements were performed at a room temperature at a rotation rate of 1 rpm in atmospheric conditions between 0° to 70° angle of rotation. Following bending, the sample was then unbent, and the test repeated 4 times. To provide flexural rigidity, the slope of applied moment vs curvature was averaged in the linear regime, after run in effects, between 20° and 40°. For each material 2 different samples were measured, and an average taken from all results to provide a flexural rigidity. Values reported are expressed per unit width for comparison of different materials.

Surface Roughness

Surface roughness was measured with a non-contact 3D profiler, the VR 3200 from Keyence. A surface area of approximately 2.7 $mm^2$ was analyzed in accordance with ISO25178 to provide the arithmetic mean height of the surface (Sa) and the maximum height of the surface (Sz). The maximum height may represent for examples areas of strands crossing over each other in a fabric.

Suture Retention Strength

Suture retention strength or suture pull-out force was measured on pieces of sheet of about 30*10 mm, through which a high-strength suture (FiberWire® 4.0) was inserted with a low-profile tapered needle in the center of the fabric and 2 mm from the edge of the short side. A Zwick Universal testing machine is used, equipped with a pneumatic Instron Grip (7 bar) and a Grip G13B, between which the looped suture and other end of the fabric are mounted with 50 mm grip-to-grip distance and preload of 0.05 N. The suture is then tensioned at test speed of 50 mm/min until failure of the sample. Suture retention strength is reported as the yield point of the measured pull out stress-strain curve (average value for 3 measurements), that is the force needed to pull the looped suture through the edge zone of the fabric.

Results

In Table 1 the compositions of 7 composite sheets based on the same polyurethane comprising polysiloxane soft segments as matrix material, and a number of different woven fabrics made from UHMWPE fibers (Examples 1-3) or from PET fibers (Examples 4-6) are summarized. Comparative Experiment 7 applies a non-woven, porous film as reinforcement. Results of tests performed on these materials and on the Carbosil® 20-80A TPU grade (Comparative Experiment 8), as well as on a porcine pericardium material (Comparative Experiment 9) are presented in Table 2. The pure polyurethane-based film showed tensile properties that are substantially independent on direction. The results provided in Table 2 for Comparative Experiment 8, listed for 45° direction, represent averaged values of all measurements, as there is no specific orientation in this material. The pericardium sheet showed not only different averaged values when measured on samples cut from the sheet in different orientations, but also quite some variation between different tensile samples. That this natural product is not uniform is further illustrated by the three representative stress-strain curves shown in FIG. 2.

For the composite sheets, the results show non-linear tensile behavior, especially by a hardening transition point in directions at an angle with warp and weft strands of the woven fabric, except for the sheet based on a porous film (Comparative Experiment 7). It also demonstrates that relevant tensile properties of a composite sheet of the present disclosure may be comparable to properties of a pericardium sheet, when measured under the same physiological-like conditions and at an angle of about 45° relative to warp or weft direction of the woven contained in the composite; with actual values being adjustable by changing the type of fabric. This is further illustrated by comparing FIG. 2 (for pericardium) and FIG. 3 (for Example 3); especially for the secant modulus and strain hardening.

In addition, the composite sheets of Examples 1-6 have a substantially higher ultimate tensile strength than the tested pericardium; in any direction and especially in warp and weft directions. This means that, if such composite sheet would be used as the material from which leaflets of a prosthetic valve are made, the maximum stress exerted on the material when in use as an implant will remain far below the level of stress that could induce immediate rupture. It is accepted in the art that in such case a material will be more resistant to fatigue failure and will show significantly longer fatigue lifetime. Therefore, significant improvement in durability of a prosthetic valve having leaflets made from such polyurethane composite sheet according to present disclosure may be expected over prior art bioprosthetic and/or synthetic valves. Fatigue evaluation experiments to determine an expected lifetime of leaflets made from composite sheets of the disclosure are still pending.

The flexural properties of a material that is to be used as for example a leaflet in a heart valve prosthesis are important for efficient opening and closing, affecting for example flow of blood. The results on flexural rigidity and other mechanical properties (see Table 2) indicate that a higher number of strands in a woven, and higher weave density result in less flexibility of the composite.

In Table 2, results of suture pull out testing (in warp and weft direction of the woven fabric in the composite sheet) are summarized. The results indicate that a significantly higher force can be applied to a suture passing through a composite sheet of the disclosure (near a cut edge) than through a sheet of treated pericardium (measured in one direction).

Note that the composite based on a microporous UHMWPE membrane (0° orientation in this case means machine direction of the biaxially stretched film) shows good strength, extensibility, and pliability; but unlike the composite sheets based on woven fabric, shows no hardening transition point upon elongation, and relatively low force to pull out the suture.

Surface roughness measurements showed that the composites based on wovens have average and maximum roughness comparable to the pericardium material. A composite sheet can also be made to have one side having a smoother surface than the other, for example by making or post-treating a sheet on a support or mandrel having a smooth surface.

TABLE 1

Sample compositions

| | Reinforcement | | | | Composite sheet | | |
| --- | --- | --- | --- | --- | --- | --- | --- |
| Experiment | Type | Areal density $(g/m^2)$ | Number of warp strands (EPI) | Number of weft strands (PPI) | Arial density $(g/m^2)$ | Thickness $(\mu m)$ | Amount of polyurethane (mass %) |
| Ex. 1 | 2 × 2 twill weave; based on 10 dtex UHWMPE yarn | 30 | 465 | 221 | 35 | 80 | 35.0 |
| Ex. 2 | plain weave; based on 10 dtex UHWMPE yarn | 18 | 117 | 161 | 46 | 75 | 55.8 |
| Ex. 3 | mock leno weave; based on 10 dtex UHWMPE yarn | 20 | 181 | 303 | 44 | 87 | 54.5 |
| Ex. 4 | plain weave; based on 23 dtex PET yarn | 44 | 300 | 154 | 70 | 86 | 37.8 |
| Ex. 5 | plain weave; based on 52 dtex PET yarn | 64 | 166 | 152 | 8 | 103 | 21.2 |
| Ex. 6 | plain weave; based on 46 dtex PET yarn | 81 | 254 | 133 | 98 | 131 | 17.8 |
| Comp. Ex. 7 | microporous UHMWPE film; | 7 | — | — | 26 | 55.6 | 73.4 |

TABLE 2

| | | \multicolumn{6}{c|}{Mechanical properties} | | | |
| Experiment | | Ex. | Ex. | Ex. | Ex. | Ex. | Ex. | Comp. | Comp. | Comp. |
| Property | (unit) | 1 | 2 | 3 | 4 | 5 | 6 | Ex. 7 | Ex. 8 | Ex. 9 |
|---|---|---|---|---|---|---|---|---|---|---|
| 1% Secant modulus | (MPa) | | | | | | | | | |
| @ 0° | | 1509 | 2551 | 329 | 1017 | 797 | 798 | 276 | | 2.7 |
| @ 90° | | 381 | 277 | 391 | 550 | 441 | 673 | 249 | | 2.3 |
| @ 45° | | 106 | 58.1 | 38.4 | 150 | 128 | 181 | 392 | 25.9 | 3.1 |
| Hardening modulus | (MPa) | | | | | | | | | |
| @ 0° | | 4698 | 6491 | 3528 | 340 | 365 | 321 | 149 | | 44.2 |
| @ 90° | | 4027 | 1860 | 2288 | 244 | 354 | 290 | 166 | | 38.1 |
| @ 45° | | 625 | 397 | 206 | 109 | 117 | 120 | 183 | 6.7 | 62.8 |
| Hardening transition point | (%) | | | | | | | | | |
| @ 0° | | 2.4 | 1.0 | 2.1 | −2.3 | −0.3 | −1.8 | −5.0 | | 31.1 |
| @ 90° | | 5.0 | 5.8 | 4.2 | 1.1 | 4.1 | 1.2 | −2.9 | | 34.3 |
| @ 45° | | 30.8 | 31.0 | 36.0 | 17.2 | 13.1 | 12.0 | −5.1 | 183 | 30.2 |
| Tensile strength | (MPa) | | | | | | | | | |
| @ 0° | | 375 | 289 | 167 | 112 | 104 | 108 | 66.6 | | 8.7 |
| @ 90° | | 221 | 134 | 142 | 65.7 | 98.3 | 74.3 | 39.7 | | 10.7 |
| @ 45° | | 134 | 83.8 | 42.3 | 57.5 | 65.9 | 58.5 | 54.6 | 31.1 | 7.1 |
| Strain at maximum force | (%) | | | | | | | | | |
| @ 0° | | 11.5 | 5.9 | 7.6 | 41.4 | 35.1 | 36.3 | 51.9 | | 50.5 |
| @ 90° | | 10.7 | 12.9 | 11.0 | 45.9 | 41.4 | 43.0 | 36.4 | | 52.3 |
| @ 45° | | 54.1 | 52.5 | 60.2 | 85.8 | 75.7 | 72.5 | 41.2 | 591 | 47.4 |
| Flexural rigidity/ unit width | (N · m) | | | | | | | | | |
| @ 0° | | 49.7 | 24.2 | 13.9 | | | | | | |
| @ 90° | | 15.7 | 7.0 | 20.8 | | | | | | |
| @ 45° | | 17.4 | 7.4 | 13.1 | | | | | | |
| Suture pull-out force | (N) | | | | | | | | | |
| @ 0° | | 36.8 | 20.6 | 29.1 | | | 12.4 | 0.7 | | 2.4 |
| @ 90° | | 34.0 | 18.6 | 19.0 | | | 11.6 | 0.3 | | 2.4 |
| Surface roughness | (μm) | | | | | | | | | |
| Sa | | 6.0 | 7.0 | 9.4 | 3.7 | | 6.0 | 4.0 | 2.0 | 12 |
| Sz | | 54.3 | 69.1 | 97.3 | 37.0 | | 72.0 | 33.5 | 67.9 | 104 |

The invention claimed is:

1. A polyurethane composite sheet comprising:
   a fabric comprised of braided or woven strands of biocompatible, high-strength polymer fibers, the fabric having a thickness of 15-150 μm, a low areal density and an open structure; and
   a biocompatible and biostable polyurethane elastomer comprising polysiloxane segments, the polyurethane elastomer forming a continuous matrix of the composite sheet which fully covers and embeds the strands of the fabric sufficient to render the composite sheet non-porous; wherein
   the composite sheet comprises 10-90 mass % of the polyurethane elastomer, has a thickness of 25-250 μm and an areal density of 5-300 g/m²; and wherein
   the composite sheet has, in at least one direction, a non-linear uniaxial tensile behavior characterized by a 1%-secant modulus of 20-200 MPa, a hardening transition point at 10-45%, and a tensile strength of at least 25 MPa as measured in water at 37° C.

2. The polyurethane composite sheet according to claim 1, wherein the polyurethane elastomer is a thermoplastic polyurethane elastomer (TPU) which comprises soft blocks that are based on a polysiloxane diol and one or more of an aliphatic polycarbonate diol and a poly (tetramethylene oxide) diol.

3. The polyurethane composite sheet according to claim 1, wherein the polyurethane elastomer comprises one or more hydrophobic endgroups comprising a polysiloxane.

4. The polyurethane composite sheet according to claim 1, wherein a highest flexural rigidity of the composite sheet is at most 45 Nm.

5. The polyurethane composite sheet according to claim 1, wherein a largest difference in flexural rigidity/unit width of the polyurethane composite sheet as measured in any two orthogonal directions is at most 20 Nm.

6. The polyurethane composite sheet according to claim 1, wherein the composite sheet has a largest difference in flexural rigidity/unit width of the polyurethane composite sheet of at most 20 Nm for each of i) a warp direction) (0°) relative to an angle of 45° with respect to warp and weft, and ii) a weft direction) (90°) relative to an angle of 45° with respect to warp and weft.

7. The polyurethane composite sheet according to claim 1, wherein the composite sheet has a largest difference in flexural rigidity/unit width of the polyurethane composite sheet as measured in any two orthogonal directions of less than 60% of a higher measurement.

8. The polyurethane composite sheet according to claim 1, wherein the composite sheet has a largest difference in flexural rigidity/unit width of the polyurethane composite sheet as measured in any two directions 45° apart of less than 60% of a highest measurement.

9. The polyurethane composite sheet according to claim 1, wherein the composite sheet has a largest difference in flexural rigidity/unit width of the polyurethane composite sheet of less than 60% of a highest measurement for each of i) a warp direction) (0°) relative to an angle of 45° with respect to warp and weft, and ii) a weft direction (90°) relative to an angle of 45° with respect to warp and weft.

10. The polyurethane composite sheet according to claim 1, wherein the fabric is a woven fabric having a warp strands per inch (EPI) and a weft strands per inch (PPI), wherein each of the EPI and the PPI is from 30 to 350 strands per inch.

11. The polyurethane composite sheet according to claim 1, wherein the fabric is a woven fabric having a difference between warp strands per inch (EPI) and weft strands per inch (PPI) of at most 200.

12. The polyurethane composite sheet according to claim 1, wherein the composite sheet has at least one textured surface having a surface roughness Sa of 3-12 μm and Sz of 20-100 μm as measured according to ISO25178.

13. The polyurethane composite sheet according to claim 1, wherein the fabric is leno weave fabric or a mock leno weave fabric.

14. The polyurethane composite sheet according to claim 1, wherein the fabric in the composite sheet is a woven fabric which includes warp and weft strands having a titer of 6-60 dtex.

15. The polyurethane composite sheet according to claim 1, wherein the fibers are present as multifilament yarns that form strands of the fabric.

16. The polyurethane composite sheet according to claim 1, wherein the high-strength polymer fibers are ultrahigh molecular weight polyethylene (UHMWPE) fibers or polyethylene terephthalate (PET) fibers each having a tenacity of 0.6-4.0 N/tex.

17. The polyurethane composite sheet according to claim 1, wherein the fabric has a thickness of 20-100 μm and the composite sheet has a thickness of 25-125 μm.

18. A method of making the polyurethane composite sheet according to claim 1, wherein the method comprises the steps of:

(a) providing the fabric comprising braided or woven strands of biocompatible, high-strength polymer fibers;

(b) optionally activating the surface of the fabric by pre-treating the surface of the fabric with a high-energy source; and (c) embedding the fabric within the biocompatible and biostable polyurethane elastomer comprising polysiloxane segments thereby forming the non-porous polyurethane composite sheet.

19. An implantable medical device comprising the polyurethane composite sheet of claim 1.

* * * * *